United States Patent

Yanai

(10) Patent No.: US 9,508,130 B2
(45) Date of Patent: Nov. 29, 2016

(54) IMAGE PROCESSING APPARATUS, IMAGE PROCESSING METHOD, AND STORAGE MEDIUM FOR PERFORMING IMAGE RESTORATION

(71) Applicant: CANON KABUSHIKI KAISHA, Tokyo (JP)

(72) Inventor: Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/882,939

(22) Filed: Oct. 14, 2015

(65) Prior Publication Data

US 2016/0110852 A1    Apr. 21, 2016

(30) Foreign Application Priority Data

Oct. 17, 2014   (JP) ................................ 2014-212997
Sep. 7, 2015    (JP) ................................ 2015-175837

(51) Int. Cl.
  *G06K 9/40*   (2006.01)
  *G06T 5/00*   (2006.01)
  *G06T 5/20*   (2006.01)

(52) U.S. Cl.
  CPC ........ *G06T 5/003* (2013.01); *G06T 5/20* (2013.01)

(58) Field of Classification Search
  USPC ....................................................... 382/264
  See application file for complete search history.

(56) References Cited

U.S. PATENT DOCUMENTS

| 5,978,522 A | * | 11/1999 | Ishii | ................... | G06T 3/4084 |
|---|---|---|---|---|---|
| | | | | | 358/452 |
| 2010/0103467 A1 | * | 4/2010 | Abe | ................... | H04N 1/4055 |
| | | | | | 358/3.13 |
| 2012/0141027 A1 | * | 6/2012 | Hatakeyama | ........... | G06T 5/003 |
| | | | | | 382/167 |
| 2015/0279003 A1 | * | 10/2015 | Higaki | ................ | G06K 9/4661 |
| | | | | | 382/254 |

FOREIGN PATENT DOCUMENTS

JP           9-172543 A    6/1997

* cited by examiner

*Primary Examiner* — Yon Couso
(74) *Attorney, Agent, or Firm* — Canon U.S.A. Inc., IP Division

(57) ABSTRACT

An image processing apparatus includes a first acquisition unit configured to acquire a captured image captured by an imaging system, a second acquisition unit configured to acquire first image information about a sharpness reduction that occurs in the captured image and is caused by the imaging system, a specifying unit configured to specify a restoration process on the captured image and, a third acquisition unit configured to acquire second image information about a sharpness reduction caused by an image forming system for forming an image on a recording medium, a setting unit configured to, based on the first image information and the second image information, set image restoration information, and a correction unit configured to correct the captured image by a restoration process using the image restoration information, wherein the setting unit sets the image restoration information according to a result of the specifying unit specifying the restoration process.

19 Claims, 18 Drawing Sheets

IMAGE PROCESSING APPARATUS, IMAGE PROCESSING METHOD, AND STORAGE MEDIUM FOR PERFORMING IMAGE RESTORATION

BACKGROUND OF THE INVENTION

Field of the Invention

The present invention relates to an image processing apparatus, and an image processing method for performing an image restoration process according to an imaging apparatus and an image forming apparatus on image data to be output from the image forming apparatus.

Description of the Related Art

An imaging apparatus, such as a digital camera, and an image forming apparatus, such as a printer, each has the modulation transfer function (MTF), which is a spatial frequency characteristic. Thus, in an output image from each device, image quality deterioration (e.g., a reduction in sharpness) occurs due to the spatial frequency characteristic. Then, it is known that the degree of reduction in sharpness varies depending on the differences in method and model of the imaging apparatus or the image forming apparatus, and the difference in operation mode.

Conventionally, as an image processing apparatus for improving sharpness, there is a technique discussed in Japanese Patent Application Laid-Open No. 9-172543. Based on the spatial frequency characteristic in the process of creating image data as an image formation target and the spatial frequency characteristic in an output mode for outputting the image data, this technique sets the correction characteristic of the image data to achieve a spatial frequency characteristic (a target transfer characteristic) of the entirety of an image processing system.

In a digital camera, which is an imaging apparatus, a sharpness reduction may occur due to the blur of a lens. Thus, to reduce the sharpness reduction, then based on an instruction from a user, the process may be performed of restoring an image such that the image is less blurred. That is, even if the same imaging apparatus and the same operation mode (image capturing condition) are used, the sharpness of a captured image to be generated changes depending on an instruction from the user. Thus, even if the same camera, the same lens, and the same operation mode (image capturing condition) are used, images to be generated include both an image restored such that the optical system is less blurred, and an image that is not restored.

In the technique discussed in the publication of Japanese Patent Application Laid-Open No. 9-172543, however, an image forming apparatus cannot acquire information which indicates the degree of restoration (correction) of the sharpness reduction performed by the user as described above. Thus, if a captured image of which sharpness is adjusted to various restoration states by the user is provided to the image forming apparatus, it is not possible to perform appropriate printing sharpness restoration in the processing on the image forming apparatus side.

That is, if an image restoration process for restoring the sharpness is performed based on the spatial frequency characteristic in the process of creating image data and the spatial frequency characteristic of the image forming apparatus, the sharpness correction may be too large. This may lead to overcorrection.

SUMMARY OF THE INVENTION

The present invention is directed to, when an image forming apparatus outputs a captured image input from an imaging apparatus, and even if the captured image adjusted to various restoration states is input from the imaging apparatus, performing image restoration appropriate for output from the image forming apparatus.

To solve the above problem, according to an aspect of the present invention, an image processing apparatus includes a first acquisition unit configured to acquire a captured image captured by an imaging system, a second acquisition unit configured to acquire first image information about a sharpness reduction that occurs in the captured image and is caused by the imaging system, a specifying unit configured to specify a restoration process according to the first image information on the captured image and, a third acquisition unit configured to acquire second image information about a sharpness reduction caused by an image forming system for forming an image on a recording medium based on the captured image, a setting unit configured to, based on the first image information and the second image information, set image restoration information for correcting at least one of the sharpness reduction caused by the imaging system and the sharpness reduction caused by the image forming system, and a correction unit configured to correct the captured image by a restoration process using the image restoration information, wherein the setting unit sets the image restoration information according to a result of the specifying unit specifying the restoration process.

Further features of the present invention will become apparent from the following description of exemplary embodiments with reference to the attached drawings.

DESCRIPTION OF THE EMBODIMENTS

Suitable exemplary embodiments for performing the present invention will be described in detail below with reference to the attached drawings.

The exemplary embodiments described below illustrate an example of a unit for achieving the present invention and should be appropriately modified or changed depending on the configuration of an apparatus to which the present invention is applied and various conditions. Thus, the present invention is not limited to the following exemplary embodiments.

Figure 1:
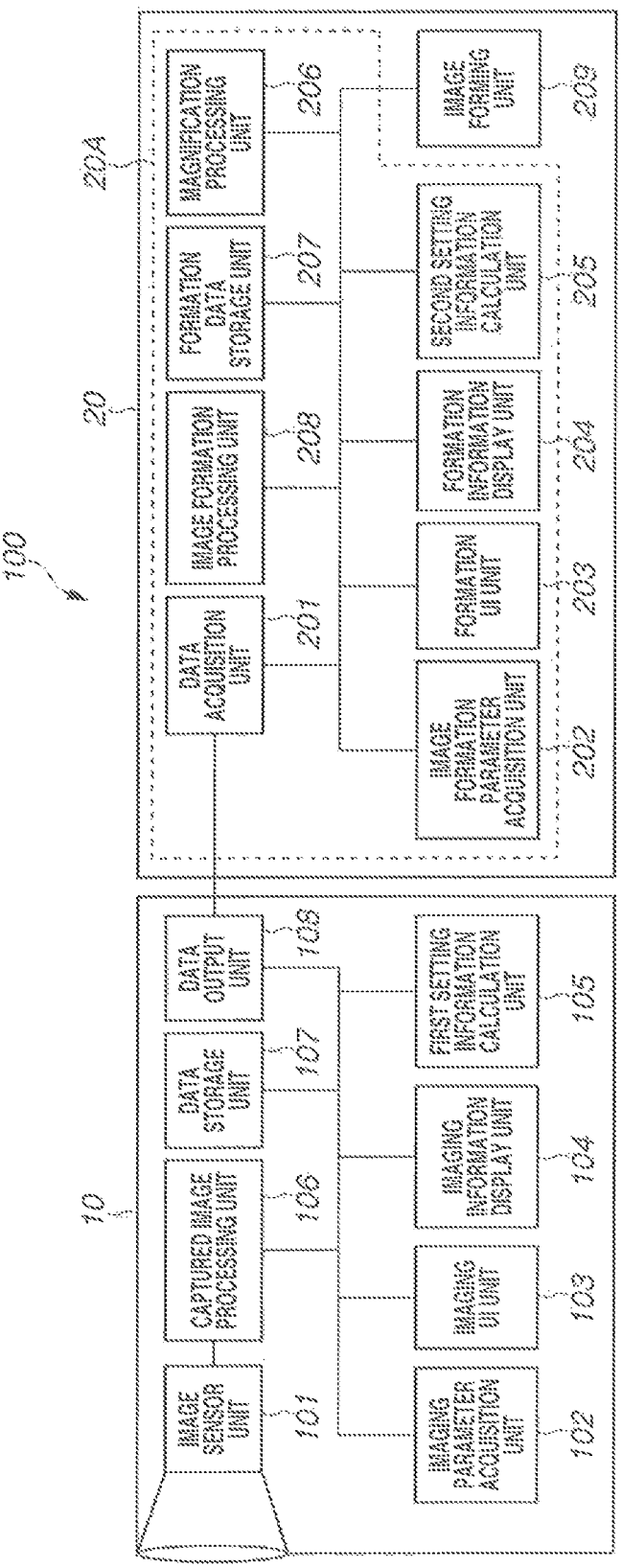
FIG. 1 is a functional block diagram illustrating an example of an imaging apparatus and an image forming apparatus that are included in an image processing system according to a first exemplary embodiment.

FIG. 1 is a diagram illustrating an example of the configuration of an image processing system according to a first exemplary embodiment.

An image processing system 100 includes an imaging apparatus 10 and an image forming apparatus 20. The imaging apparatus 10 and the image forming apparatus 20 are connected together, for example, via a serial bus interface, such as a Universal Serial Bus (USB) interface or an Institute of Electrical and Electronics Engineers (IEEE) 1394 interface, or via a circuit.

The imaging apparatus 10 is an image input apparatus, such as a digital camera and includes an image sensor unit 101, an imaging parameter acquisition unit 102, an imaging user interface (UI) unit 103, an imaging information display unit 104, a first setting information calculation unit 105, a captured image processing unit 106, a data storage unit 107, and a data output unit 108.

The image sensor unit 101 captures an object image and converts an optical image formed on the imaging surface of an image capture unit (described below) including a lens and a camera, into a digital electric signal by photoelectric conversion.

Figure 2:
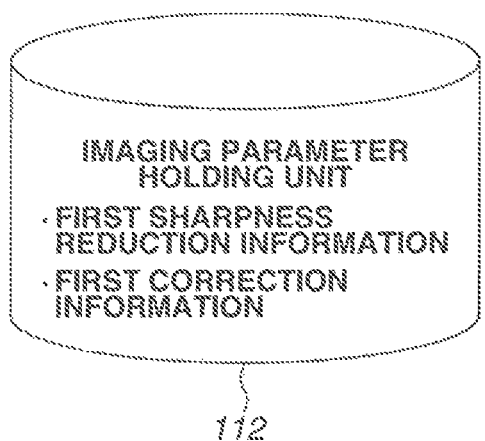
FIG. 2 is a diagram illustrating an imaging parameter holding unit.

The imaging parameter acquisition unit 102 reads and acquires, from an imaging parameter holding unit 112 illustrated in FIG. 2, first sharpness reduction information and first correction information that are held in the imaging parameter holding unit 112. The first sharpness reduction information refers to information about image deterioration (a sharpness reduction) caused by an imaging system (the image capture unit) of the imaging apparatus 10. The first correction information refers to information for correcting the sharpness reduction of the image capture unit.

More specifically, the first sharpness reduction information is information representing image deterioration (a reduction in sharpness) resulting from various aberrations of an imaging optical system and is represented by p(x,y), which is a point spread function (PSF), or a spatial frequency characteristic obtained by performing Fourier transform on p(x,y). In this case, (x,y) indicates coordinates of an image in real space.

Further, the first correction information is represented by a spatial filter coefficient h(x,y). This first correction information is the inverse function (inverse filter) of the first sharpness reduction information.

The imaging apparatus 10 may be an image input apparatus, such as a scanner (a reading apparatus) for capturing an image of an object by bringing an image sensor into close contact with the surface of the object, an X-ray imaging apparatus or the like.

For example, an image input apparatus has an imaging system different depending on the method of the imaging apparatus, such as a digital camera or a flatbed scanner. Thus, the degree of sharpness reduction varies. Further, even in the same digital camera, the degree of sharpness reduction varies depending on the model. Furthermore, even in the same imaging apparatus, the degree of sharpness reduction varies depending on the operation mode. For example, the degree of sharpness reduction can vary also depending on an image capturing condition mode, such as whether a high-speed scanning mode or a low-speed scanning mode is used in a flatbed scanner, or whether the amount of stopping down is great or small in a digital camera.

Therefore, the imaging parameter holding unit 112 holds in advance a plurality of pieces of first sharpness reduction information according to the differences in method and model and the difference in operation mode as described above.

The imaging UI unit 103 causes the imaging information display unit 104 to display an input screen for allowing a user to input imaging instruction information and also acquires the imaging instruction information input by the user through the input screen. The user may input the imaging instruction information, for example, using a touch pen on a screen displayed on a touch panel by the imaging information display unit 104, or by performing an operation on an operation unit (an input unit), such as various switches and a directional pad that are provided in the imaging apparatus 10.

The imaging UI unit 103 acquires, as the imaging instruction information, information indicating whether to correct the sharpness reduction of the lens and the camera in the image capture unit. In a case where the sharpness reduction is to be corrected, the imaging UI unit 103 acquires information (a first editing value p1) indicating the amount of correction (the strength of correction). The first editing value p1 is an editing value indicating a degree of restoration of the sharpness reduction in the imaging apparatus 10.

The imaging information display unit 104 displays the input screen, a captured image and the like on a display (a display unit).

Based on the first editing value p1 and the first correction information h(x,y), the first setting information calculation unit 105 calculates first setting information g(x,y) for use in the process of actually correcting (restoring) the sharpness reduction (hereinafter referred to also as an "image restoration process"). The first setting information g(x,y) is an image restoration filter obtained by adjusting an image restoration strength according to an instruction from the user. The first setting information may be a spatial frequency characteristic obtained by performing Fourier transform on g(x,y).

The captured image processing unit 106 performs on an object image an image restoration process for correcting the optical sharpness reduction of the image capture unit, using the first setting information g(x,y) calculated by the first setting information calculation unit 105, thereby generating a captured image. The captured image processing unit 106 causes the imaging information display unit 104 to display the generated captured image.

The data storage unit 107 stores a captured image generated by the captured image processing unit 106. Further, simultaneously, in a case where first sharpness reduction information and first setting information that correspond to the captured image can be saved, the data storage unit 107 also saves the first sharpness reduction information and the first setting information.

The data output unit 108 can be connected to the image forming apparatus 20 via a cable or the like and can be connected to a recording medium, such as a memory card. Then, the data output unit 108 outputs a captured image stored in the data storage unit 107 directly to the image forming apparatus 20 or to the recording medium.

The configuration of the image forming apparatus 20 is described.

The image forming apparatus 20 is, for example, a printer and includes an image processing unit 20A. The image processing unit 20A includes a data acquisition unit 201, an image formation parameter acquisition unit 202, a formation UI unit 203, a formation information display unit 204, a second setting information calculation unit 205, a magnification processing unit 206, a formation data storage unit 207, and an image formation processing unit 208. The image forming apparatus 20 also includes an image forming unit (image forming system) 209.

The data acquisition unit 201 acquires a captured image captured by the imaging apparatus 10, for example, from the imaging apparatus 10 or a recording medium in which the captured image captured by the imaging apparatus 10 is recorded. In this process, the data acquisition unit 201 determines whether first sharpness reduction information and first setting information that correspond to the captured image can be acquired. In a case where the first sharpness reduction information and the first setting information can be acquired, the data acquisition unit 201 also acquires the first sharpness reduction information and the first setting information.

Figure 3:
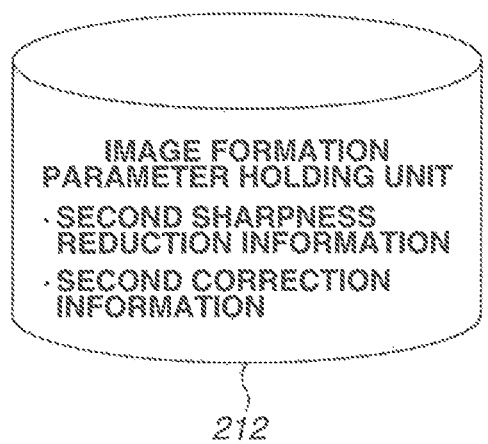
FIG. 3 is a diagram illustrating an image formation parameter holding unit.

The image formation parameter acquisition unit 202 reads and acquires, from an image formation parameter holding unit 212 illustrated in FIG. 3, second sharpness reduction information and second correction information that are held in the image formation parameter holding unit 212. The second sharpness reduction information refers to information indicating a sharpness reduction caused by the image forming system (the image forming unit 209). The second correction information refers to information for correcting the sharpness reduction of the image forming unit 209. The image formation parameter acquisition unit 202 does not necessarily need to acquire the second sharpness reduction information, and may acquire only the second correction information.

The second sharpness reduction information is represented by, for example, a spatial frequency characteristic. In this case, it is assumed that the second correction information is the inverse characteristic of the second sharpness reduction information. The second correction information, however, may only need to be set according to the second sharpness reduction information to correct the sharpness reduction, and may not necessarily need to be the very inverse characteristic of the second sharpness reduction information. For example, dot gain and the amount of shift of the landing position that are caused by ink or toner vary depending on the method of the image forming apparatus, such as an inkjet printer or an electrophotographic printer. Thus, the degree of sharpness reduction varies. Further, the degree of sharpness reduction varies also depending on the model. Furthermore, the degree of sharpness reduction varies also depending on whether a high-quality printing mode or a high-speed printing mode is used in an inkjet printer, or whether a glossy paper recording mode or a plain paper recording mode is used in an inkjet printer. To what degree the sharpness reduction is to be corrected may be appropriately set according to the output characteristic of the image forming system.

In the present exemplary embodiment, the formation parameter holding unit 212 holds in advance a plurality of pieces of second sharpness reduction information according to the differences in method and model and the difference in operation mode as described above.

The formation UI unit 203 causes the formation information display unit 204 to display an input screen for allowing the user to input formation instruction information and also acquires the formation instruction information input by the user through the input screen. The user may input the formation instruction information, for example, using a touch pen on a screen displayed on a touch panel by the formation information display unit 204, or by performing an operation on an operation unit (an input unit), such as various switches and a directional pad.

The formation UI unit 203 acquires, as the formation instruction information, information about the output size of an image.

Based on at least one of first sharpness reduction information and first setting information that correspond to a captured image, and second correction information acquired by the image formation parameter holding unit 212, the second setting information calculation unit 205 calculates second setting information $k(x,y)$ for use in the process of actually correcting (restoring) the sharpness reduction (an image restoration process). The second setting information $k(x,y)$ is an image restoration filter for achieving appropriate printing sharpness restoration taking into account a sharpness reduction caused by the image capture unit and the degree of restoration (correction) of the sharpness reduction in the imaging apparatus 10, which is adjusted by the user. The second setting information calculation unit 205 firstly specifies, for example, whether the image restoration process for correcting the sharpness reduction on the side of the imaging apparatus 10 has already been performed on an acquired captured image or how the captured image had been processed for restoring the sharpness reduction of the imaging apparatus 10 and then calculates the second setting information $k(x,y)$ based on the specifying result. In a case where these items can be specified, the second setting information calculation unit 205 calculates the second setting information $k(x,y)$ using information about image deterioration which occurs in the captured image and is caused by the imaging system of the imaging apparatus 10.

In the present exemplary embodiment, according to which of the first sharpness reduction information, the first setting information, the second sharpness reduction information, and the second correction information can be acquired, the second setting information calculation unit 205 changes the method for calculating second setting information $k(x,y)$. Then, the second setting information calculation unit 205 outputs the calculated second setting information $k(x,y)$ to the image formation processing unit 208.

The magnification processing unit 206 changes the magnification of a captured image to the resolution with which an image is to be formed by the image forming unit 209. The magnification processing unit 206 changes the magnification of a captured image based on a magnification according to the output size indicated by the user and outputs to the formation data storage unit 207 the captured image of which the magnification is changed. The "magnification" as used herein includes both enlargement and reduction.

The formation data storage unit 207 stores in a formation data memory (not illustrated) a captured image of which the magnification is changed by the magnification processing unit 206.

The image formation processing unit 208 performs on a captured image an image restoration process for correcting the sharpness reduction, using the second setting information k(x,y) calculated by the second setting information calculation unit 205, thereby generating a formation image. The image formation processing unit 208 outputs the generated formation image to the image forming unit 209.

The image forming unit 209 controls the driving of a printing unit to perform image formation for fixing ink or toner to a sheet-like recording medium, such as paper, using a formation image generated by the image formation processing unit 208.

(Hardware Configurations of Imaging Apparatus 10 and Image Forming Apparatus 20)

Figure 4:
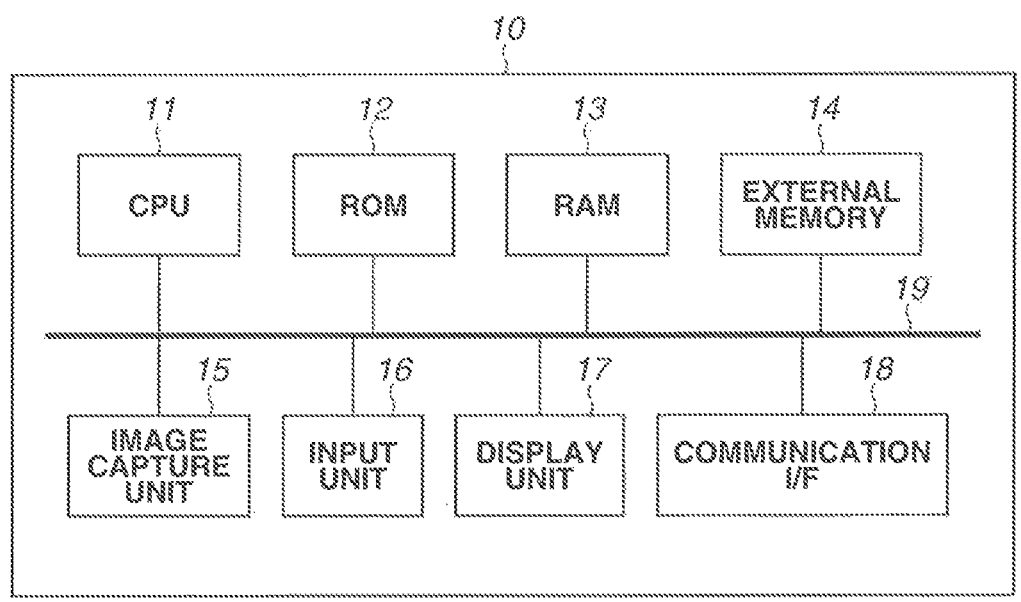
FIG. 4 is a diagram illustrating an example of a hardware configuration of the imaging apparatus.

FIG. 4 is an example of the hardware configuration of the imaging apparatus 10.

The imaging apparatus 10 includes a central processing unit (CPU) 11, a read-only memory (ROM) 12, a random-access memory (RAM) 13, an external memory 14, an image capture unit 15, an input unit 16, a display unit 17, a communication interface (I/F) 18, and a system bus 19.

The CPU 11 performs overall control of operations in the imaging apparatus 10 and controls all the components (12 to 18) via the system bus 19.

The ROM 12 is a non-volatile memory for storing, for example, a control program necessary when the CPU 11 performs processing. The program may be stored in the external memory 14 or an attachable and detachable storage medium (not illustrated).

The RAM 13 functions as a main memory or a work area for the CPU 11. That is, when performing processing, the CPU 11 loads a necessary program from the ROM 12 into the RAM 13 and executes the program, thereby achieving various functional operations.

The external memory 14 stores, for example, various types of data and various types of information that are necessary when the CPU 11 performs processing using a program. Further, the external memory 14 stores, for example, various types of data and various types of information that are obtained by the CPU 11 performing processing using a program. The external memory 14 includes the imaging parameter holding unit 112 and a data memory.

The image capture unit 15 captures an image of an object and includes a lens and a camera. The camera includes an optical low-pass filter (LPF), a mechanical shutter, and an image sensor, such as a charge-coupled device (CCD) sensor or a complementary metal-oxide-semiconductor (CMOS) sensor.

The input unit 16 includes various switches, a directional pad, and a power button. The user of the imaging apparatus 10 can provide an instruction to the imaging apparatus 10 through the input unit 16.

The display unit 17 includes a monitor, such as a liquid crystal display (LCD).

The communication I/F 18 is an interface for communicating with an external apparatus (the image forming apparatus 20 in this case). The communication I/F 18 is, for example, a USB interface.

The system bus 19 connects the CPU 11, the ROM 12, the RAM 13, the external memory 14, the image capture unit 15, the input unit 16, the display unit 17, and the communication I/F 18 so that these components can communicate with each other.

The functions of the components of the imaging apparatus 10 illustrated in FIG. 1 and the functions of the components of the image forming apparatus 20 illustrated in FIG. 1 are achieved by the CPU 11 executing a program stored in the ROM 12 or the external memory 14.

In the case of the image forming apparatus 20 according to the present exemplary embodiment, a printing unit is included in the hardware configuration, instead of the image capture unit 15 illustrated in FIG. 4. In a case where the image forming apparatus 20 is a printer, the printing unit includes, for example, a print head and a nozzle and forms an image (prints an image on a printing medium) based on a formation image. Alternatively, the printing unit may output a formation image to a printer engine. Further, in the case of the image forming apparatus 20, an external memory corresponding to the external memory 14 illustrated in FIG. 4 includes the image formation parameter holding unit 212 and a formation data memory.

In FIG. 1, the data acquisition unit 201 corresponds to examples of a first acquisition unit and a second acquisition unit. The image formation parameter acquisition unit 202 corresponds to an example of a third acquisition unit. The second setting information calculation unit 205 corresponds to an example of a setting unit. The image formation processing unit 208 corresponds to an example of a correction unit. Further, the magnification processing unit 206 corresponds to an example of a magnification unit. The formation UI unit 203 and the formation information display unit 204 correspond to examples of a display unit.

(Image Processing Procedure by Imaging Apparatus 10)

Figure 5:
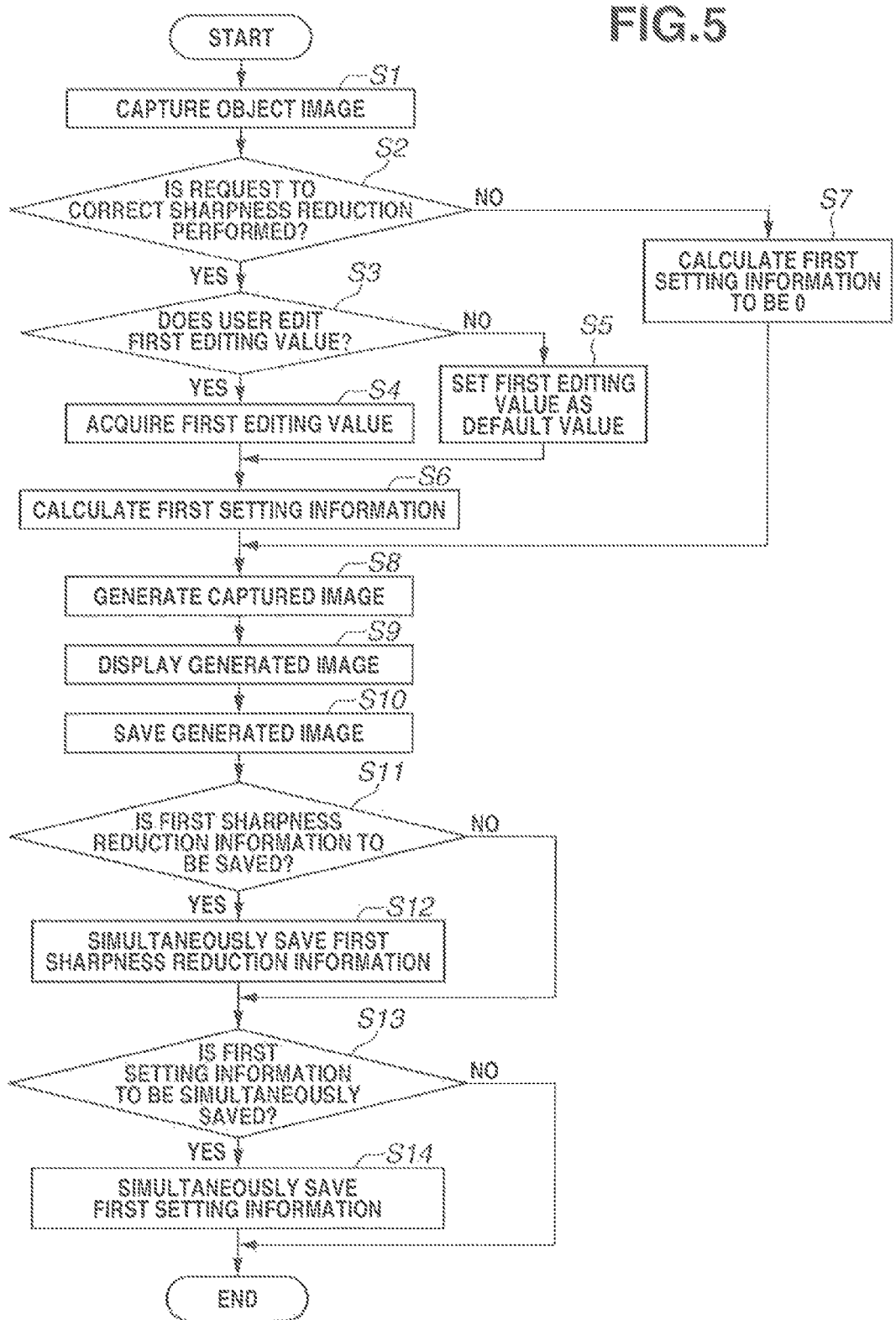
FIG. 5 is a flowchart illustrating an image processing procedure performed by the imaging apparatus.

FIG. 5 is a flowchart illustrating an example of an image processing procedure performed by the imaging apparatus 10. The processing illustrated in FIG. 5 is achieved by the CPU 11 illustrated in FIG. 4 reading and executing a program stored in the ROM 12 or the external memory 14. In the present exemplary embodiment, the processing in FIG. 5 is, for example, started at the timing when the user inputs an image capturing start instruction to the imaging apparatus 10. The timing of the start of the processing in FIG. 5, however, is not limited to the above timing.

In step S1, the imaging apparatus 10 causes the image sensor unit 101 to capture red, green, and blue (RGB) data, which is an object image. The captured RGB data includes data rt(x,y), data gt(x,y), and data bt(x,y). These object images rt, gt, and bt are once stored in the data memory.

Figure 6:
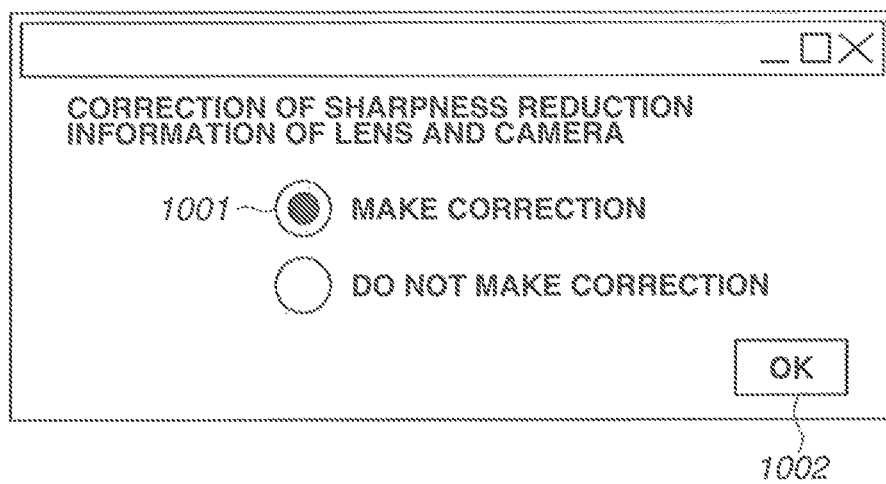
FIG. 6 is an example of display of a confirmation screen for sharpness reduction correction.

In step S2, the imaging apparatus 10 determines whether the user intends to correct the sharpness reduction of the captured image. The imaging information display unit 104 may display on the display, for example, a confirmation screen as illustrated in FIG. 6, thereby allowing the user to input an instruction (imaging instruction information). In such a case, in step S2, for example, in a case where the imaging apparatus 10 acquires information indicating that the user checks "make correction" as in a check 1001 and presses an "OK" button 1002 on the confirmation screen illustrated in FIG. 6, the imaging apparatus 10 determines that the user intends to correct the sharpness reduction.

Then, in a case where it is determined in step S2 that the user intends to correct the sharpness reduction, the processing proceeds to step S3. In a case where it is determined that the user does not intend to correct the sharpness reduction, the processing proceeds to step S7.

Figure 7:
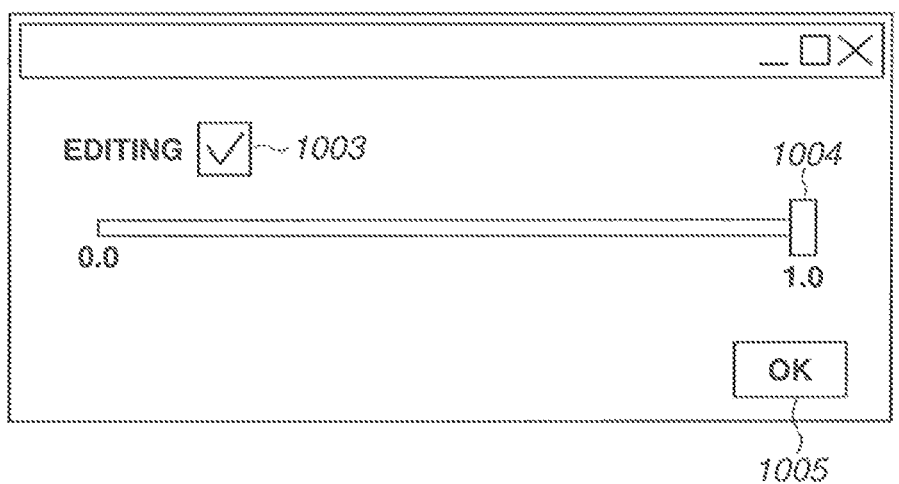
FIG. 7 is an example of display of an editing screen for a correction strength.

In step S3, the imaging apparatus 10 determines whether the user edits the amount of correction (adjusts the correction strength) for correcting the sharpness reduction caused by the imaging apparatus 10. The imaging information display unit 104 may display on the display, for example, an editing screen as illustrated in FIG. 7, thereby allowing the user to input an instruction (imaging instruction information). In such a case, in step S3, for example, in a case where the imaging apparatus 10 acquires information indicating that the user checks an "editing" button as in a check 1003 and changes the position of a slide bar 1004 from a default position (1.0) on the editing screen illustrated in FIG. 7, the imaging apparatus 10 determines that the user edits the amount of correction of the sharpness reduction.

Then, in a case where it is determined in step S3 that the user edits the amount of correction of the sharpness reduction, the processing proceeds to step S4. In a case where it is determined that the user does not edit the amount of correction of the sharpness reduction, the processing proceeds to step S5.

In step S4, the imaging apparatus 10 acquires an editing value (a correction strength value) of the amount of correction of the sharpness reduction that is indicated by the user, and the processing proceeds to step S6. In this process, for example, when the imaging apparatus 10 acquires information indicating that the user presses an "OK" button 1005 on the editing screen illustrated in FIG. 7, the imaging apparatus 10 may simultaneously acquire a value indicated by the slide bar 1004 at that timing. The value acquired by the process is the editing value. In the present exemplary embodiment, this value is a first editing value p1. The first editing value p1 is a value within the range of equal to 0.0 or more and equal to 1.0 or less.

On the other hand, in step S5, the imaging apparatus 10 sets the first editing value p1 to 1.0, which is a default value, and the processing proceeds to step S6.

In step S6, based on the first editing value p1 set in step S4 or S5 and first correction information h(x,y), held in the imaging parameter holding unit 112, for correcting the sharpness reduction of the image capture unit, the imaging apparatus 10 calculates first setting information g(x,y) for use in an actual image restoration process, using the following formula:

$$g(x,y)=h(x,y) \times p1 + dlt(x,y) \qquad (1),$$

where dlt(x,y) is a delta function in which a coefficient positioned at the center is 1.0 and other coefficients are 0.0.

As described above, the first setting information g(x,y) is represented based on the product of the first correction information h(x,y) and the first editing value p1.

Figure 8:
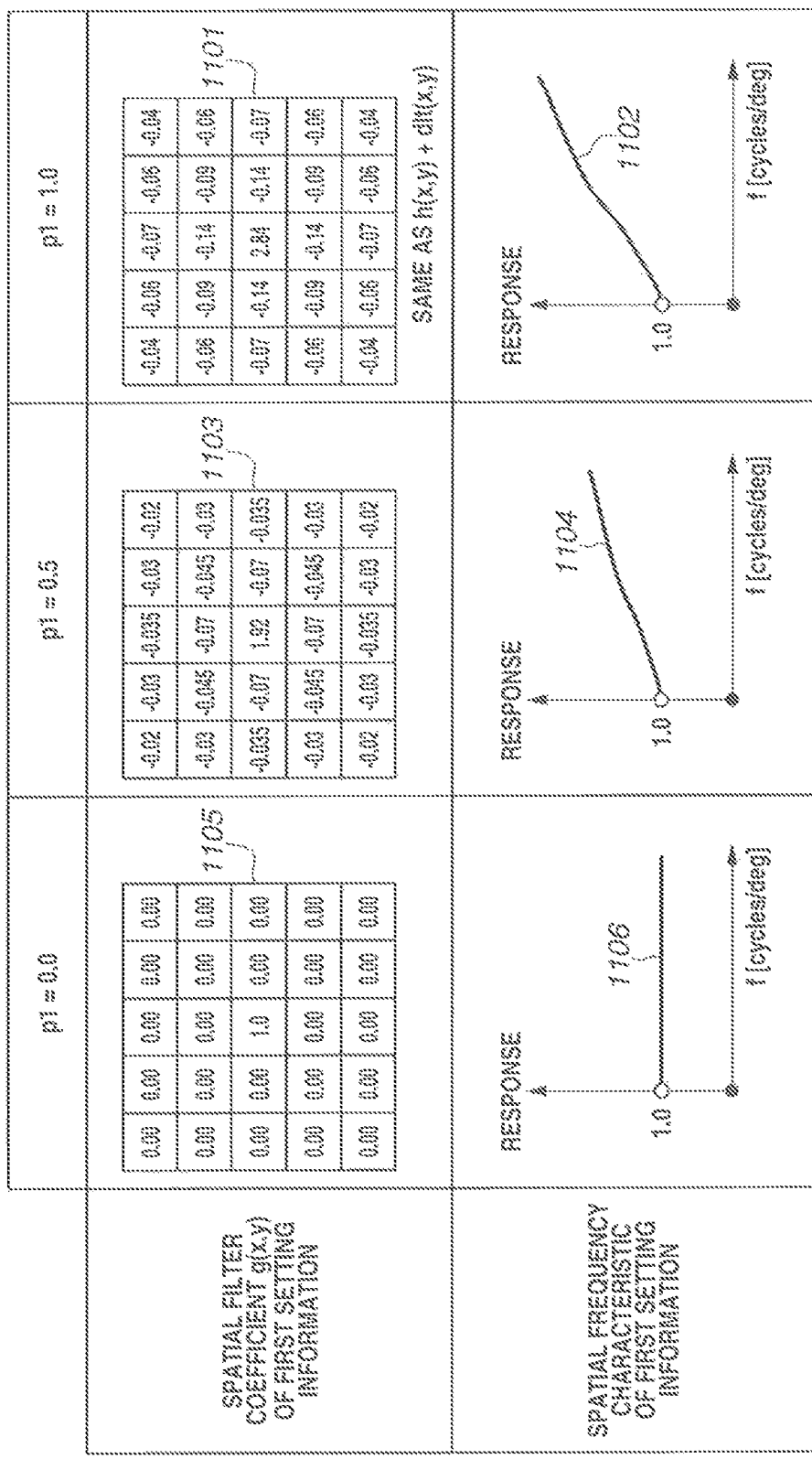
FIG. 8 is a diagram illustrating the relationship between a first editing value and first setting information.

That is, if p1=1.0, then as illustrated in FIG. 8, first setting information 1101, which is represented by a spatial filter coefficient g(x,y), is equal to the one obtained by adding the delta function dlt(x,y) to the first correction information h(x,y), and the first setting information based on which the sharpness reduction occurred in the imaging apparatus 10 would be corrected. The spatial frequency response of the first setting information in this process is a spatial frequency characteristic 1102, which is described below.

Further, if p1=0.5, then as illustrated in FIG. 8, first setting information 1103, which is represented by a spatial filter coefficient g(x,y), indicates half the amount of correction of the first correction information h(x,y). The spatial frequency response of the first setting information in this process is a spatial frequency characteristic 1104, which is described below.

Further, if p1=0.0, then as illustrated in FIG. 8, first setting information 1105, which is represented by a spatial filter coefficient g(x,y), is 0 except the coefficient positioned at the center (delta function). This means that the sharpness reduction is not to be corrected. The spatial frequency response of the first setting information in this process is a spatial frequency characteristic 1106, which is described below.

The first editing value p1 can be successively set by the user, and therefore, the first setting information is successively set according to the first editing value p1.

Further, as the first setting information, a set of the spatial filter coefficient g(x,y) and the first editing value p1 may be held. Alternatively, as the first setting information, the first correction information h(x,y) may be held instead of the spatial filter coefficient g(x,y).

Referring back to FIG. 5, in a case where it is determined in step S2 that the user does not intend to correct the sharpness reduction, the processing proceeds to step S7. In step S7, the imaging apparatus 10 sets first setting information, which is a spatial filter coefficient g(x,y), to 0 (the first editing value p1=0.0). That is, the sharpness reduction is not to be corrected.

In step S8, the imaging apparatus 10 generates a captured image including captured images rs, gs, and bs as follows, using the first setting information g(x,y) calculated in step S6 or S7:

$$rs(x,y)=rt(x,y)*g(x,y) \qquad (2),$$

$$gs(x,y)=gt(x,y)*g(x,y) \qquad (3), \text{ and}$$

$$bs(x,y)=bt(x,y)*g(x,y) \qquad (4).$$

In the above formulas, "*" represents convolution (convolution integration or the sum of products). A captured image is thus generated by performing a convolution process on the object image, using the first setting information.

In step S8, for example, a captured image may be generated at the timing when the imaging apparatus 10 acquires information indicating that the user presses a captured image generation button (not illustrated) displayed by the imaging information display unit 104. Further, in the above process, convolution is performed on the RGB data. Alternatively, the RGB data may be converted into YCbCr data, and then, a convolution process may be performed only on a luminance-Y signal. Yet alternatively, the above convolution process may be performed using Fast Fourier Transform. In such a case, the RGB data is converted into a spatial frequency domain using Fast Fourier Transform. Then, an integration process is performed, and then, inverse Fast Fourier Transform is performed.

In step S9, the imaging apparatus 10 displays on the display the captured image generated in step S8, and the processing proceeds to step S10.

In step S10, the imaging apparatus 10 stores in the data memory the captured image generated in step S8, and the processing proceeds to step S11.

In step S11, the imaging apparatus 10 determines whether first sharpness reduction information is to be saved in association with the captured image. In step S11, for example, in a case where the imaging apparatus 10 acquires information indicating that the user presses a sharpness reduction information saving button (not illustrated) displayed by the imaging information display unit 104, the imaging apparatus 10 may determine that first sharpness reduction information is to be saved in association with the captured image.

Then, in a case where first sharpness reduction information is to be saved in association with the captured image, the processing proceeds to step S12. The imaging apparatus 10 saves the first sharpness reduction information in the data memory, and the processing proceeds to step S13. In a case where, on the other hand, it is determined in step S11 that first sharpness reduction information is not to be saved, the processing proceeds to step S13.

In this process, in step S12, the first sharpness reduction information may be saved in a tag of the associated captured image, or may be saved as additional information of the captured image. Further, the first sharpness reduction information may be saved as a spatial frequency characteristic obtained by performing Fourier transform on p(x,y), which is a point spread function. Further, the configuration may be such that as the first sharpness reduction information, only information that allows the specifying of the type of the image capture unit (the camera and the lens) is saved, and the first sharpness reduction information is downloaded from an external network.

In step S13, the imaging apparatus 10 determines whether the first setting information is to be saved in association with the captured image. In step S13, for example, in a case where the imaging apparatus 10 acquires information indicating that the user presses a setting information saving button (not illustrated) displayed by the imaging information display unit 104, the imaging apparatus 10 may determine that the first setting information is to be saved in association with the captured image.

Then, in a case where the first setting information is to be saved in association with the captured image, the processing proceeds to step S14. In step S14, the imaging apparatus 10 saves the first setting information in the data memory, and the image processing illustrated in FIG. 5 ends. In a case where, on the other hand, it is determined in step S13 that the first setting information is not to be saved, the image processing illustrated in FIG. 5 ends.

In this process, in step S13, the first setting information may be saved in a tag of the associated captured image, or may be saved as additional information of the captured image. Further, the first setting information may be saved as a spatial frequency characteristic obtained by performing Fourier transform on g(x,y), which is represented by a spatial filter coefficient. Further, as the first setting information, the first editing value p1 may be saved.

As described above, the imaging apparatus 10 performs on an object image an image restoration process (a sharpness reduction correction process) for correcting image deterioration (a sharpness reduction) caused by the image capture unit, thereby generating a captured image. In this process, the degree (strength) of correction of the sharpness reduction is adjusted according to an instruction from the user.

In the present exemplary embodiment, the user can successively set the first editing value p1 in the range of $0.0 \leq p1 \leq 1.0$. Thus, the captured image generated by the image restoration process can enter various restoration states based on an instruction from the user. That is, captured images generated by the imaging apparatus 10 can include both an image restored such that the imaging optical system is less blurred, and an image that is not restored. More specifically, among the captured images generated by the imaging apparatus 10, there are some images in which the sharpness reduction is fully restored and other images in which the sharpness reduction occurs (remains).

In the above example, a case has been described where a strength value is specified as the first editing value p1. Alternatively, the value of the spatial frequency at which the sharpness reduction is to be restored may be specified. For example, in a case where the sharpness reduction at a spatial frequency less than or equal to a specified spatial frequency value is to be corrected (restored), and if the value of the specified spatial frequency is great, the frequency range in which the sharpness reduction is to be corrected (restored) is wide. Thus, the degree of correction (restoration) is great. Conversely, if the value of the designated spatial frequency is small, the frequency range in which the sharpness reduction is to be corrected (restored) is narrow. Thus, the degree of correction (restoration) is small.

Further, in the present exemplary embodiment, depending on the user's intention, there may be a situation where the first sharpness reduction information or the first setting information (or the first editing value p1) that corresponds to the generated captured image is not to be saved. Not only in the present exemplary embodiment but also in the process of image retouching using internal software or external software of a digital camera, tag information or additional information may be removed without the user's intention. Further, also depending on the image saving format selected by the user, the tag information or the additional information may be removed without the user's intention.

Thus, sharpness reduction information of the imaging apparatus 10 and information for correcting the sharpness reduction (the amount of correction actually used in the image restoration process) may not be transmitted to the image forming apparatus 20. Therefore, the image forming apparatus 20 performs image processing so that appropriate printing sharpness restoration can be performed according to whether the sharpness reduction information of the imaging apparatus 10 and/or information for correcting the sharpness reduction is acquired.

(Image Processing Procedure by Image Forming Apparatus 20)

Figure 9:
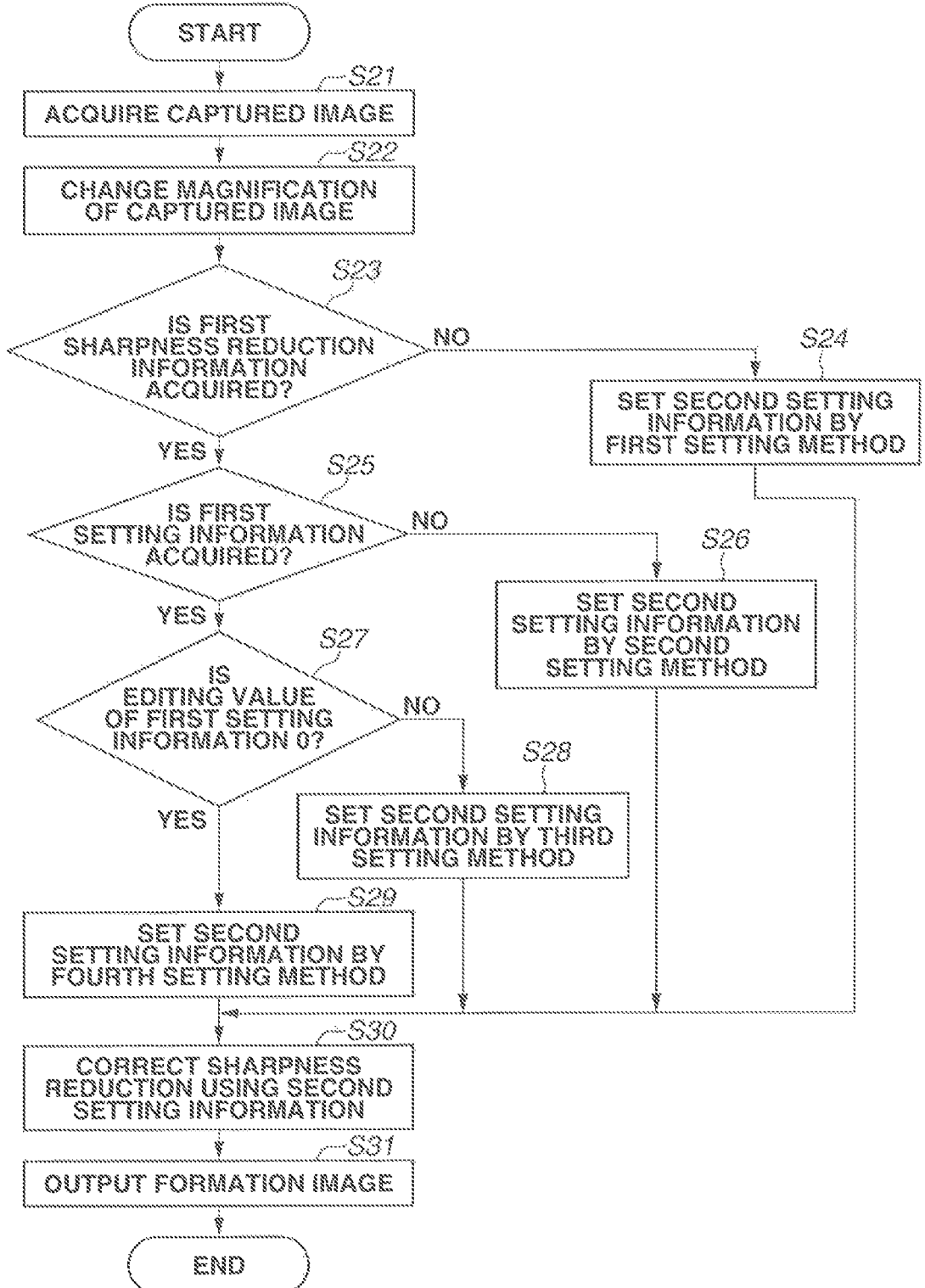
FIG. 9 is a flowchart illustrating an image processing procedure performed by the image forming apparatus.

FIG. 9 is a flowchart illustrating an example of an image processing procedure performed by the image forming apparatus 20. The processing illustrated in FIG. 9 is achieved by the CPU included in the image forming apparatus 20 reading and executing a program stored in the ROM or the external memory. In the present exemplary embodiment, the processing in FIG. 9 is, for example, started at the timing when the user provides an input to instruct the image forming unit 209 to start outputting a captured image. The timing of the start of the processing in FIG. 9, however, is not limited to the above timing.

In step S21, the image forming apparatus 20 acquires a captured image from the imaging apparatus 10, and the processing proceeds to step S22.

In step S22, the image forming apparatus 20 changes the magnification of the captured image acquired in step S21 to the resolution for print. For example, a case is assumed where a captured image having 4800×4800 pixels is to be output from a printer having an output resolution of 1200× 1200 dpi. In such a case, in a case where the output size is 4×4 inches (10.16×10.16 cm), it is not necessary to change the magnification of the captured image. However, for example, in a case where the output size is 8×8 inches, it is necessary to enlarge the captured image to twice its size vertically and horizontally. Further, in a case where the output size is 3×3 inches, it is necessary to reduce the captured image to three-quarters of its size vertically and horizontally.

In step S22, the image forming apparatus 20 acquires information about the output size specified by the user through the formation UI unit 203 and performs the above magnification process based on a magnification according to the indicated output size. The captured image of which the magnification is changed is once held in the formation data memory.

In step S23, the image forming apparatus 20 determines whether first sharpness reduction information corresponding to the captured image acquired in step S21 is acquired. Then, in a case where it is determined that the first sharpness reduction information is not acquired, the processing proceeds to step S24. In a case where it is determined that the first sharpness reduction information is acquired, the processing proceeds to step S25.

In step S23, even if the first sharpness reduction information is not directly acquired, but if the types of the lens and the camera of the imaging apparatus can be specified, and first sharpness reduction information of the corresponding lens and camera can be acquired via an external network, it is determined that the first sharpness reduction information is acquired.

In step S24, based only on second sharpness reduction information, which is information indicating the sharpness reduction of the image forming unit 209, the image forming apparatus 20 calculates second setting information k(x,y) for use in an image restoration process (a first setting method). In step S24, the degree of sharpness reduction that occurs in the imaging apparatus 10 cannot be specified. Thus, the image forming apparatus 20 calculates second setting information k(x,y) for correcting only the sharpness reduction of the image forming unit 209.

Figure 10:
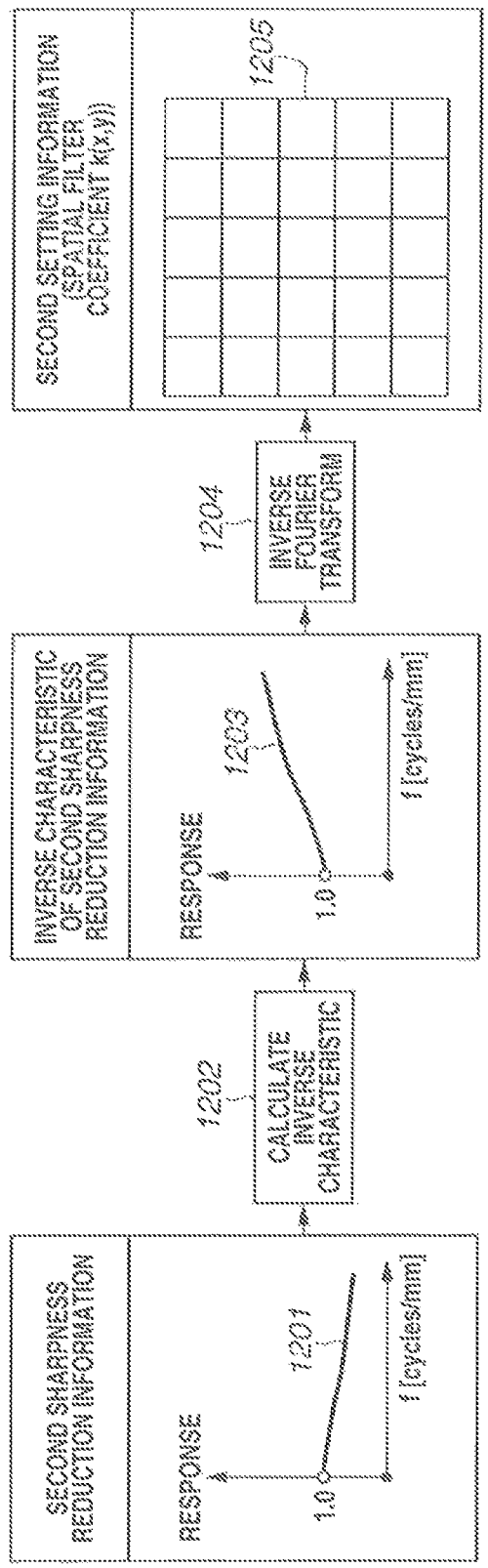
FIG. 10 is a diagram illustrating a first setting method of second setting information.

FIG. 10 is a block diagram illustrating the first setting method performed in step S24.

The image forming apparatus 20 acquires, from the image formation parameter holding unit 212, second sharpness reduction information 1201, which is provided as a spatial frequency characteristic. Then, as illustrated in FIG. 10, the image forming apparatus 20 performs an inverse characteristic calculation process 1202 on the second sharpness reduction information 1201, thereby obtaining an inverse characteristic 1203 of the second sharpness reduction information. The inverse characteristic 1203 is second correction information for correcting the sharpness reduction of the image forming unit 209. It is possible to achieve a similar function also by holding second correction information in advance, instead of acquiring the second sharpness reduction information 1201.

The second correction information is not limited to the very inverse characteristic 1203 of the second sharpness reduction information 1201, and may only need to be generated to correct the sharpness reduction based on the second sharpness reduction information. Further, the image forming apparatus 20 may presume first sharpness reduction information of the image capture unit 10, from the spatial frequency characteristic of the image acquired by the image capture unit 10. For example, the image forming apparatus 20 may presume first sharpness reduction information from the degree of blur on the edges of the image acquired by the image capture unit 10, thereby presuming first setting information for eliminating the blur in an edge portion (information for correcting the blur of the image capture unit).

The image forming apparatus 20 performs an inverse Fourier transform process 1204 on the inverse characteristic 1203, thereby obtaining a spatial filter coefficient k(x,y) 1205. The spatial filter coefficient k(x,y) is second setting information for correcting only the sharpness reduction of the image forming unit 209.

A description has been given of, as the first setting method, a method for setting second setting information k(x,y) based only on second sharpness reduction information as illustrated in FIG. 10. Alternatively, a method for predicting the sharpness reduction of the image capture unit as much as possible, and then setting second setting information k(x,y) to correct the predicted sharpness reduction may be employed.

For example, in addition to the correction of the sharpness reduction illustrated in FIG. 10, further correction of the sharpness reduction may be added insomuch that image failure does not occur. The image failure refers to a state where due to overcorrection of the sharpness reduction, clipping to outside the color gamut (for example, the value of any one of the RGB elements is equal to or greater than 255 or less than or equal to 0, or the color is white or black) occurs. The clipping to outside the color gamut refers to the phenomenon that if the calculated value of any one of the RGB elements is equal to or greater than 255 (in the case of 8 bits) or less than or equal to 0 as a result of correction, the value remains 255 or 0. If overcorrection is made to the extent that such clipping to outside the color gamut occurs, image failure such as ringing, overshooting, or the like is likely to occur in the image.

Therefore, in a case where second setting information k(x,y) is set by predicting the sharpness reduction of the imaging apparatus 10, the second setting information may be set taking into account the occurrence of the above image failure, so that the number of pixels or the ratio of pixels in which clipping occurs on the image is less than or equal to a predetermined value. This setting is also applicable to image failure other than clipping to outside the color gamut, such as ringing, an increase in image noise, or color misregistration (color imbalance or color blurring).

Consequently, it is possible to reduce the occurrence of image failure and also reduce insufficient correction due to the correction of only the sharpness reduction of the image forming unit 209.

Referring back to FIG. 9, in step S25, the image forming apparatus 20 determines whether first setting information corresponding to the captured image acquired in step S21 is acquired. In a case where the first setting information is acquired, it indicates that how the captured image had been processed for restoring the sharpness reduction of the imaging apparatus 10 can be specified. Then, in a case where it is determined that the first setting information is not acquired, the processing proceeds to step S26. In a case where it is determined that the first setting information is acquired, the processing proceeds to step S27.

In step S26, based on second sharpness reduction information, which is information indicating the sharpness reduction of the image forming unit 209, and the first sharpness reduction information, which indicates the sharpness reduction of the imaging apparatus 10, the image forming apparatus 20 calculates second setting information k(x,y) (a second setting method). In step S26, the image forming apparatus 20 cannot specify the first setting information (at what degree the sharpness reduction is corrected by the imaging apparatus 10), but the first sharpness reduction information (at what degree the sharpness reduction occurs in the imaging apparatus 10) is clear. Thus, the image forming apparatus 20 adjusts the sharpness reduction component of the imaging apparatus 10 and also calculates second setting information k(x,y) for correcting the sharpness reduction of the image forming unit 209.

Figure 11:
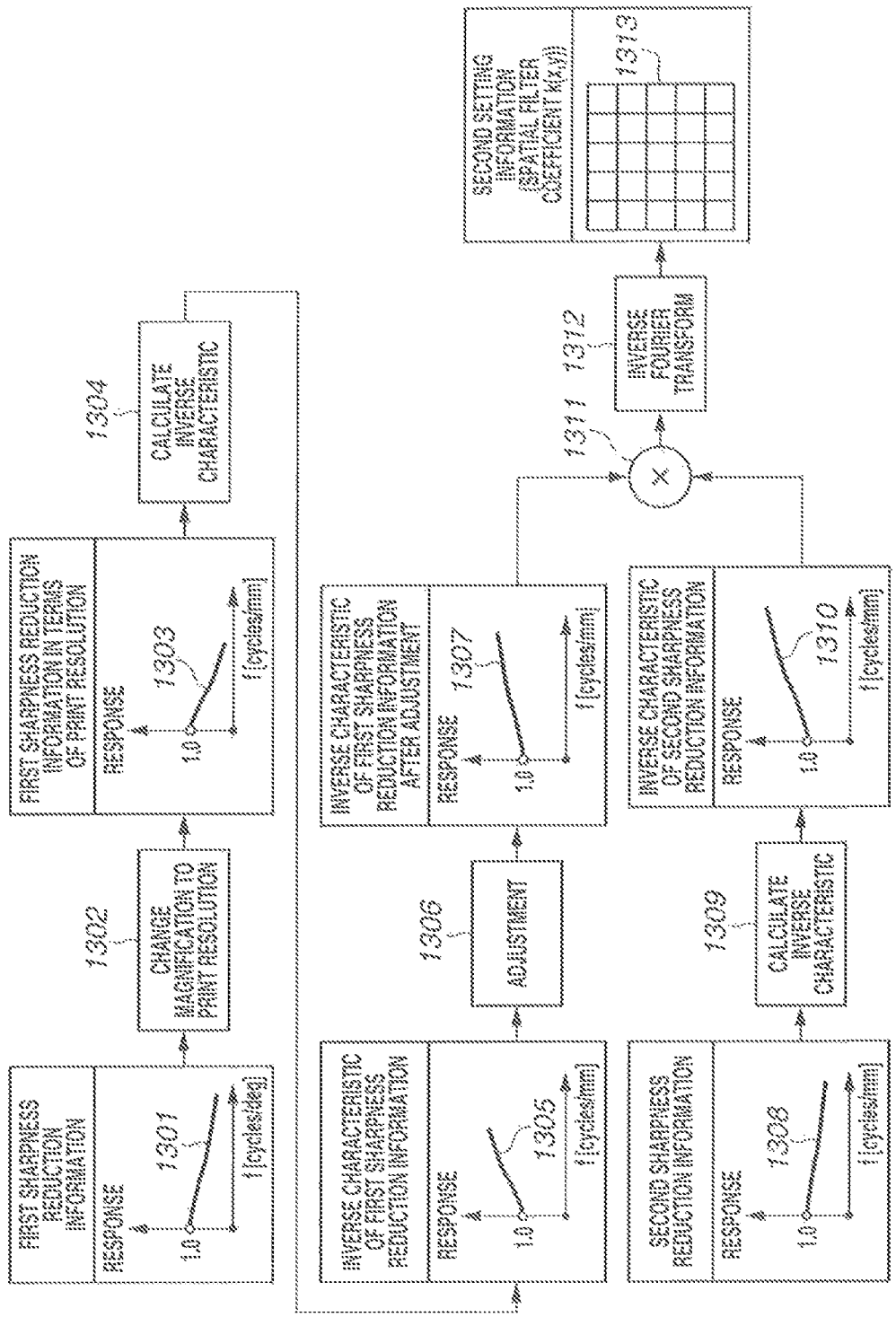
FIG. 11 is a diagram illustrating a second setting method of the second setting information.

FIG. 11 is a block diagram illustrating the second setting method performed in step S26.

As illustrated in FIG. 11, first, the image forming apparatus 20 performs a magnification process 1302 on first sharpness reduction information 1301, which is provided as a spatial frequency characteristic. In the magnification process 1302, the image forming apparatus 20 performs the process of changing the axis of the spatial frequency from "[cycles/degree]" to "[cycles/mm]" to correspond to the magnification changed in step S22. Consequently, the image forming apparatus 20 obtains first sharpness reduction information 1303 in terms of print resolution.

Next, the image forming apparatus 20 performs an inverse characteristic calculation process 1304 on the first sharpness reduction information 1303, which is represented by a spatial frequency characteristic, thereby obtaining an inverse characteristic 1305 of the first sharpness reduction information. The inverse characteristic 1305 is information for correcting the sharpness reduction of the image capture unit. However, instead of the very inverse characteristic 1305 of the first sharpness reduction information, a characteristic slightly stronger than (having a spatial frequency characteristic higher than) the inverse characteristic may be used.

If the imaging apparatus 10 does not correct the sharpness reduction, the image forming apparatus 20 performs an image restoration process on the captured image using the inverse characteristic 1305, and thereby can appropriately correct the sharpness reduction of the image capture unit. In step S26, however, the first setting information cannot be specified, and therefore, the image restoration process using the inverse characteristic 1305 may lead to overcorrection.

Therefore, the image forming apparatus 20 performs an adjustment process 1306, thereby making adjustment to weaken the inverse characteristic 1305. In this process, for example, the image forming apparatus 20 adds 1 to the value obtained by multiplying (1−a response value) by any constant (an adjustment value $\alpha$) smaller than 1, thereby calculating an inverse characteristic 1307 of the first sharpness reduction information after adjustment. The inverse characteristic 1307 is information for correcting part of the sharpness reduction of the imaging apparatus 10 (or all of the sharpness reduction of the imaging apparatus 10 in a case where the imaging apparatus 10 does not correct the sharpness reduction).

The adjustment value $\alpha$ can take a value within the range of equal to 0.0 or more and equal to 1.0 or less. In the present exemplary embodiment, in the case of equal magnification printing (no change in the magnification), the adjustment value $\alpha$ is set to 0.5. In the case of enlargement, a value smaller than 0.5 is set. In the case of reduction, a value greater than 0.5 is set. Further, the adjustment value $\alpha$ may be set such that the more enlarged, the smaller the value, and such that the more reduced, the greater the value. That is, the adjustment value $\alpha$ is set to have a tendency to weaken correction in the case of enlargement and strengthen correction in the case of reduction. The reason for this will be described below.

In step S26 in FIG. 9, the first setting information is not specified by the image forming apparatus 20. Thus, if the imaging apparatus 10 performs an ideal image restoration process (that is, the first editing value p1=1.0), and if the adjustment value $\alpha$ is set to 1, the imaging apparatus 10 and the image forming apparatus 20 doubly correct the sharpness reduction of the image capture unit. This leads to overcorrection. Conversely, if the imaging apparatus 10 does not perform an image restoration process at all (that is, the first editing value p1=0.0), and if the adjustment value $\alpha$ is set to 0, the sharpness reduction of the image capture unit is not corrected at all. This leads to insufficient correction.

In the present exemplary embodiment, the adjustment value $\alpha$ is set to 0.5, so that image failure is not great even if the imaging apparatus 10 corrects the sharpness reduction, and so that the sharpness can be somewhat restored even if the imaging apparatus 10 does not correct the sharpness reduction. Further, it is easier to visually confirm the failure (ringing or overshooting) of an image captured by the imaging apparatus 10 in the case of reduction printing than in the case of enlargement printing. This is because the size of a captured image per pixel is larger in enlargement printing. Thus, in the case of enlargement, it is desirable to set the adjustment value a to be smaller than 0.5. In the case of reduction, in which failure is less conspicuous, it is desirable to set the adjustment value $\alpha$ to be greater than 0.5. In the above example, a case has been illustrated where the adjustment value $\alpha$ is set to be greater (correction is greater) in the case of reduction than in the case of enlargement. Alternatively, the amount of correction may be determined based not only on the enlargement/reduction ratio but also on the spatial frequency characteristic of the image after enlargement or reduction. For example, in a case where the amounts of power spectrum components and amplitude spectrum components equal to or greater than a certain frequency [cycles/mm] are small in the spatial frequency characteristic [cycles/mm] of the plane of the paper after enlargement or reduction, the adjustment value $\alpha$ is set to be great (correction is great). In a case where, on the other hand, the amounts of power spectrum components and amplitude spectrum components equal to or greater than the certain frequency are great in the spatial frequency characteristic of the image before enlargement or reduction, the adjustment value $\alpha$ is set to be small (correction is small). The reason for this is that if the amounts of power spectrum components and amplitude spectrum components equal to or greater than the certain frequency is large, clipping to outside the color gamut is likely to occur due to correction. Thus, image failure, such as ringing or overshooting, is likely to occur. The adjustment value $\alpha$ (the degree of correction) may be obtained from the spatial frequency characteristic before enlargement or reduction.

Further, there is a trade-off relationship between the above setting of the adjustment value a according to the enlargement ratio and the above setting of the adjustment value $\alpha$ according to the spatial frequency characteristic [cycles/mm] on the plane of the paper after enlargement or reduction.

Specifically, the more enlarged the image, the lower the spatial frequency [cycles/mm] on the plane of the paper (if the image is enlarged, small stripes are also printed as large stripes). In this case, the more enlarged the image, the smaller the amounts of power spectrum components and amplitude spectrum components equal to or greater than the certain frequency [cycles/mm] in the spatial frequency characteristic on the plane of the paper. That is, the more enlarged the image, the smaller an adjustment value $\alpha 1$ according to the enlargement ratio of the image, but the greater an adjustment value $\alpha 2$ according to the spatial frequency characteristic on the plane of the paper.

Thus, if adjustment is made taking into account both "the enlargement ratio" and "the spatial frequency characteristic on the plane of the paper", it is necessary to calculate a comprehensive adjustment value $\alpha$ from the above two adjustment values $\alpha 1$ and $\alpha 2$. The comprehensive adjustment value $\alpha$ is obtained by $(\alpha 1 + \alpha 2)$ or $(\alpha 1 \times \alpha 2)$. For example, if the comprehensive adjustment value $\alpha = (\alpha 1 + \alpha 2)$, and if the contribution ratio of the adjustment value $\alpha 1$ according to the enlargement ratio is greater, the more enlarged the image, the smaller the value of the comprehensive adjustment value $\alpha$.

If, on the other hand, the contribution ratio of the adjustment value $\alpha 2$ according to the spatial frequency characteristic on the plane of the paper is greater, the more enlarged the image, the greater the value of the comprehensive adjustment value $\alpha$.

To sum up, it is desirable to determine the adjustment value α taking into account the contribution ratio between the enlargement ratio and the spatial frequency characteristic.

Further, in the above example, if the first setting information cannot be specified, the adjustment value α is determined taking into account the spatial frequency characteristic and the enlargement/reduction ratio. Alternatively, regardless of whether the first setting information can be specified, the adjustment value a may be determined using both or either of the enlargement ratio and the spatial frequency characteristic. Regardless of whether enlargement or reduction, the adjustment value a may be set to a fixed value (e.g., 0.5). Even if the adjustment value α is thus set to a fixed value of 0.5, the adjustment value α has a certain effect on the reduction of image failure.

Referring back to FIG. 11, to correct the sharpness reduction of the image forming unit 209, the image forming apparatus 20 performs a process similar to that of the first setting method illustrated in FIG. 10. That is, the image forming apparatus 20 performs an inverse characteristic calculation process 1309 on second sharpness reduction information 1308, which is provided as a spatial frequency characteristic, thereby obtaining an inverse characteristic 1310 of the second sharpness reduction information. The inverse characteristic 1310 is information for correcting the sharpness reduction of the image forming unit 209. It is possible to achieve a similar function also by holding, in advance, correction information for correcting the sharpness reduction, instead of the second sharpness reduction information 1308. Further, instead of the very inverse characteristic 1309, a characteristic slightly weaker than (having a spatial frequency characteristic lower than) the inverse characteristic or a characteristic slightly stronger than (having a spatial frequency characteristic higher than) the inverse characteristic may be used.

The image forming apparatus 20 obtains a product 1311 of the inverse characteristic 1310 and the inverse characteristic 1307 of the first sharpness reduction information after adjustment, which has been previously obtained. Then, the image forming apparatus 20 performs an inverse Fourier transform process 1312 on the resulting frequency characteristic, thereby obtaining a spatial filter coefficient k(x,y) 1313. The spatial filter coefficient k(x,y) is second setting information for correcting the total of part of the sharpness reduction of the imaging apparatus 10 and the sharpness reduction of the image forming unit 209.

Also in step S26, similarly to the process of step S24, further correction of the sharpness reduction may be added insomuch that image failure does not occur.

In step S27 in FIG. 9, the image forming apparatus 20 determines whether the acquired first setting information g(x,y) is 0. In a case where it is determined that the first setting information is not 0, the processing proceeds to step S28. In a case where it is determined that the first setting information is 0, the processing proceeds to step S29.

In step S28, based on second sharpness reduction information, which is information indicating the sharpness reduction of the image forming unit 209, the first sharpness reduction information, which indicates the sharpness reduction of the imaging apparatus 10, and the first setting information, which indicates the degree of correction of the sharpness reduction of the imaging apparatus 10, the image forming apparatus 20 calculates second setting information k(x,y) (a third setting method). In a case where in the process of step S27, the image forming apparatus 20 determines that the acquired first setting information g(x,y) is not 0, it indicates that the restoration process for restoring the sharpness reduction of the imaging apparatus 10 has been performed on the captured image and the degree of the performed restoration process has been specified. Then, in step S28, the image forming apparatus 20 cancels the correction of the sharpness reduction of the imaging apparatus 10 based on the first setting information and then calculates second setting information for correcting the total of the sharpness reduction of the imaging apparatus 10 and the sharpness reduction of the image forming unit 209.

Figure 12:
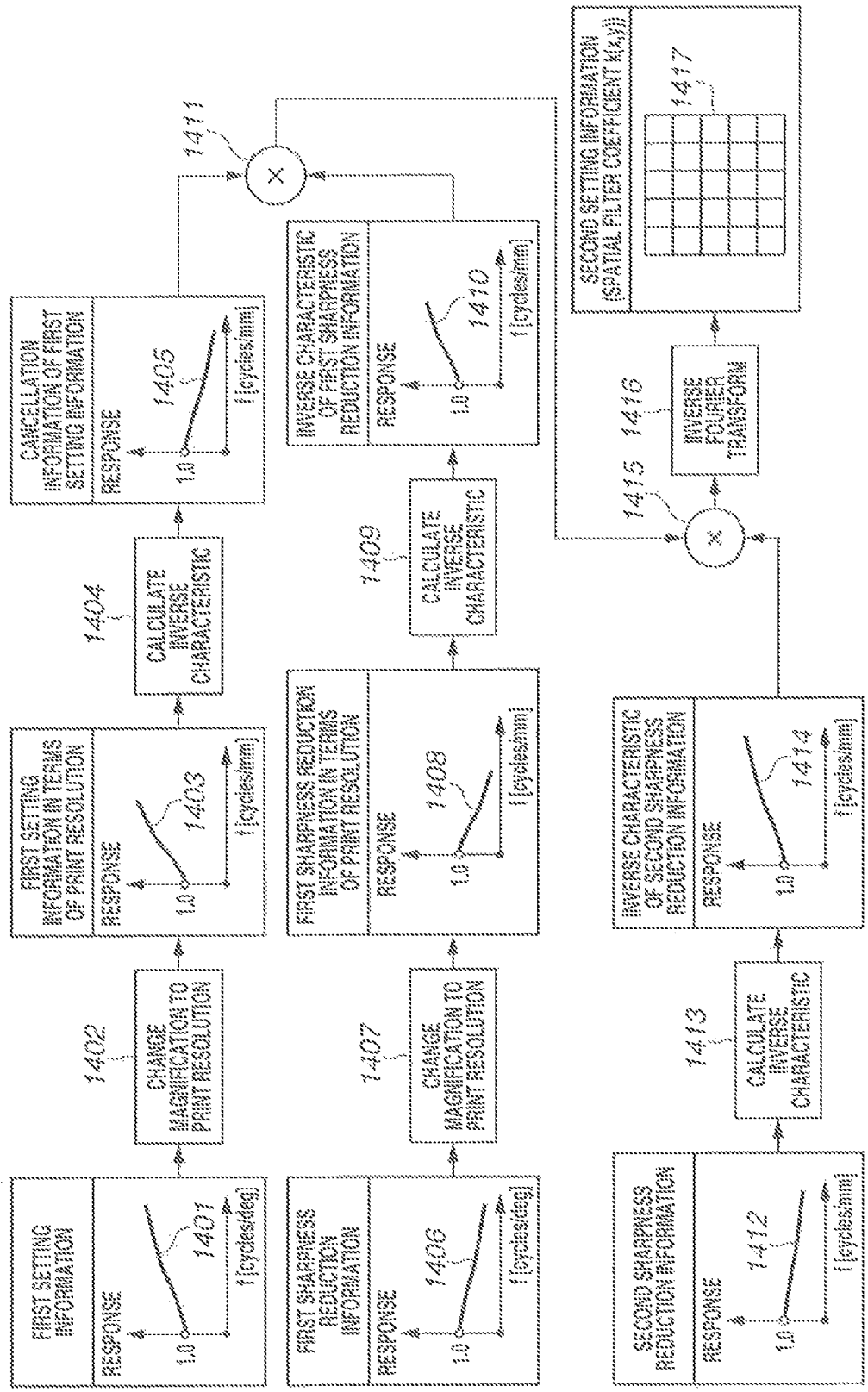
FIG. 12 is a diagram illustrating a third setting method of the second setting information.

FIG. 12 is a block diagram illustrating the third setting method performed in step S28.

As illustrated in FIG. 12, first, the image forming apparatus 20 performs a magnification process 1402 on first setting information 1401, which is provided as a spatial frequency characteristic. In the magnification process 1402, the image forming apparatus 20 performs the process of changing the axis of the spatial frequency from "[cycles/degree]" to "[cycles/mm]" to correspond to the magnification changed in step S22. Consequently, the image forming apparatus 20 obtains first setting information 1403 in terms of print resolution.

The image forming apparatus 20 performs an inverse characteristic calculation process 1404 on the first setting information 1403, which is represented by a spatial frequency characteristic, thereby obtaining an inverse characteristic 1405 of the first setting information. The inverse characteristic 1405 is cancellation information for canceling the correction of the sharpness reduction performed by the imaging apparatus 10.

The image forming apparatus 20 calculates information for correcting the sharpness reduction of the image capture unit. The image forming apparatus 20 performs a magnification process 1407 on first sharpness reduction information 1406, which is provided as a spatial frequency characteristic. In the magnification process 1407, the image forming apparatus 20 performs the process of changing the axis of the spatial frequency from "[cycles/degree]" to "[cycles/mm]" to correspond to the magnification changed in step S22. Consequently, the image forming apparatus 20 obtains first sharpness reduction information 1408 in terms of print resolution.

Next, the image forming apparatus 20 performs an inverse characteristic calculation process 1409 on the first sharpness reduction information 1408, which is represented by a spatial frequency characteristic, thereby obtaining an inverse characteristic 1410 of the first sharpness reduction information. The inverse characteristic 1410 is information for correcting the sharpness reduction of the imaging apparatus 10.

Then, the image forming apparatus 20 obtains a product 1411 of the cancellation information 1405 of the first setting information and the inverse characteristic 1410 of the first sharpness reduction information for correcting the sharpness reduction of the imaging apparatus 10. The thus obtained spatial frequency characteristic is information for canceling the half-finished correction of the sharpness reduction of the captured image and correcting the sharpness reduction of the imaging apparatus 10.

Meanwhile, to correct the sharpness reduction of the image forming unit 209, the image forming apparatus 20 performs a process similar to those of the first setting method illustrated in FIG. 10 and the second setting method illustrated in FIG. 11. That is, the image forming apparatus 20 performs an inverse characteristic calculation process 1413 on second sharpness reduction information 1412, which is provided as a spatial frequency characteristic, thereby obtaining an inverse characteristic 1414 of the second sharpness reduction information. The inverse characteristic 1414 is information for correcting the sharpness reduction of the image forming unit 209. It is possible to achieve a similar function also by holding, in advance, correction information for correcting the sharpness reduction, instead of the second sharpness reduction information 1412.

Next, the image forming apparatus 20 obtains a product 1415 of the inverse characteristic 1414 and the information for correcting the sharpness reduction of the imaging apparatus 10, which has been calculated as the product 1411. Then, the image forming apparatus 20 performs an inverse Fourier transform process 1416 on the resulting frequency characteristic, thereby obtaining a spatial filter coefficient k(x,y) 1417. The spatial filter coefficient k(x,y) is second setting information for correcting the total of the sharpness reduction of the imaging apparatus 10 and the sharpness reduction of the image forming unit 209.

It cannot be denied that even if the degrees of sharpness reduction of both the imaging apparatus 10 and the image forming unit 209 are clear, straightforward correction of the sharpness reduction may reveal image failure. Thus, also in step S28, similarly to the processes of steps S24 and S26, further correction of the sharpness reduction may be added insomuch that image failure does not occur.

In step S29 in FIG. 9, based on second sharpness reduction information, which is information indicating the sharpness reduction of the image forming unit 209, and the first sharpness reduction information, which indicates the sharpness reduction of the imaging apparatus 10, the image forming apparatus 20 calculates second setting information k(x,y) (a fourth setting method). The process of step S29 is different from the process of step S28 in that in the process of step S29, the first setting information is 0, and it can be specified that the imaging apparatus 10 has not corrected the sharpness reduction. Therefore, it is not necessary to cancel the correction of the sharpness reduction of the imaging apparatus 10 on the captured image. That is, in step S29, the image forming apparatus 20 simply calculates second setting information for correcting the total of the sharpness reduction of the image capture unit and the sharpness reduction of the image forming unit 209.

Figure 13:
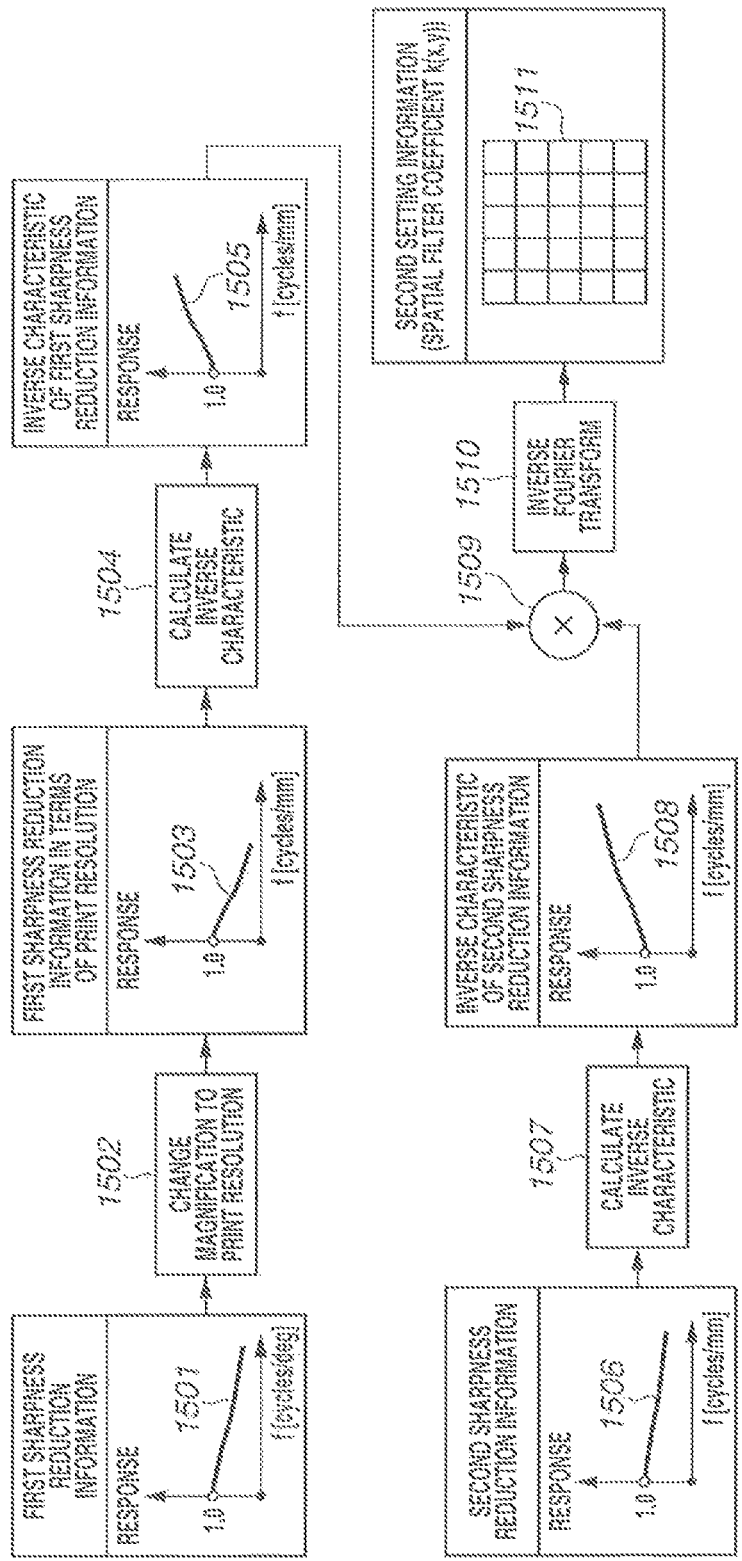
FIG. 13 is a diagram illustrating a fourth setting method of the second setting information.

FIG. 13 is a block diagram illustrating the fourth setting method performed in step S29.

As illustrated in FIG. 13, first, to correct the sharpness reduction of the imaging apparatus 10, the image forming apparatus 20 performs a process similar to that of the third setting method illustrated in FIG. 12. That is, the image forming apparatus 20 performs a magnification process 1502 on first sharpness reduction information 1501, which is provided as a spatial frequency characteristic. In the magnification process 1502, the image forming apparatus 20 performs the process of changing the axis of the spatial frequency from "[cycles/degree]" to "[cycles/mm]" to correspond to the magnification changed in step S22. Consequently, the image forming apparatus 20 obtains first sharpness reduction information 1503 in terms of print resolution.

Next, the image forming apparatus 20 performs an inverse characteristic calculation process 1504 on the first sharpness reduction information 1503, which is represented by a spatial frequency characteristic, thereby obtaining an inverse characteristic 1505 of the first sharpness reduction information. The inverse characteristic 1505 is information for correcting the sharpness reduction of the imaging apparatus 10.

Meanwhile, to correct the sharpness reduction of the image forming unit 209, the image forming apparatus 20 performs a process similar to those of the first to third setting methods illustrated in FIGS. 10 to 13. That is, the image forming apparatus 20 performs an inverse characteristic calculation process 1507 on second sharpness reduction information 1506, which is provided as a spatial frequency characteristic, thereby obtaining an inverse characteristic 1508 of the second sharpness reduction information. The inverse characteristic 1508 is information for correcting the sharpness reduction of the image forming unit 209. It is possible to achieve a similar function also by holding, in advance, correction information for correcting the sharpness reduction, instead of the second sharpness reduction information 1506.

Next, the image forming apparatus 20 obtains a product 1509 of the inverse characteristic 1508 of the second sharpness reduction information and the inverse characteristic 1505 of the first sharpness reduction information, which has been previously obtained. Then, the image forming apparatus 20 performs an inverse Fourier transform process 1510 on the resulting frequency characteristic, thereby obtaining a spatial filter coefficient k(x,y) 1511. The spatial filter coefficient k(x,y) is second setting information for correcting the total of the sharpness reduction of the imaging apparatus 10 and the sharpness reduction of the image forming unit 209.

Also in step S29, for a reason similar to that in step S28, further correction of the sharpness reduction may be added insomuch that image failure does not occur.

Next, in step S30 in FIG. 9, the image forming apparatus 20 generates a formation image including formation images rp, gp, and bp, using the second setting information k(x,y) calculated by any one of the first to fourth setting methods, as follows:

$$rp(x,y)=rp(x,y)*k(x,y) \quad (5),$$

$$gp(x,y)=gp(x,y)*k(x,y) \quad (6), \text{ and}$$

$$bp(x,y)=bp(x,y)*k(x,y) \quad (7).$$

In the above formulas, "*" represents convolution (convolution integration or the sum of products). A formation image is thus generated by performing a convolution process on the captured image, using the second setting information.

In step S30, for example, a formation image may be generated at the timing when the image forming apparatus 20 acquires information indicating that the user presses a formation image generation button (not illustrated) displayed by the formation information display unit 204. Further, in the above process, convolution is performed on the RGB data. Alternatively, the RGB data may be converted into YCbCr data, and then, a convolution process may be performed only on a luminance-Y signal. Yet alternatively, the above convolution process may be performed using Fast Fourier Transform. In such a case, the RGB data is converted into a spatial frequency domain using Fast Fourier Transform. Then, an integration process is performed, and then, inverse Fast Fourier Transform is performed.

As described above, in a case where the image forming apparatus 20 can acquire a captured image captured by the imaging apparatus 10, together with first sharpness reduction information and first setting information that correspond to the captured image, the image forming apparatus 20 acquires them. Based on whether the first sharpness reduction information and first setting information are acquired and the acquired first setting information, the image forming apparatus 20 specifies whether the process for correcting the sharpness reduction of the imaging apparatus 10 has been performed on the captured image and the degree of correction for the case where the process for correcting the sharpness reduction has been performed. Then, based on the acquired first sharpness reduction information and first setting information, and second sharpness reduction information, the image forming apparatus 20 sets second setting information for correcting a sharpness reduction caused by the image capture unit and a sharpness reduction caused by the image forming unit 209 and performs an image restoration process on the captured image.

In the above example, a case has been described where first sharpness reduction information and first setting information are acquired from the imaging apparatus 10. The present invention, however, is not limited to this. It is only necessary to be able to acquire information about image deterioration (a sharpness reduction) caused by the imaging system of the imaging apparatus 10 (first image deterioration information), and information about an image restoration process that can be performed during the process of generating a captured image captured by the imaging apparatus 10 (first image restoration information). That is, as the first image deterioration information, first correction information may be acquired, or first setting information and a first editing value p1 may be acquired, instead of first sharpness reduction information. Further, as the first image restoration information, first sharpness reduction information and a first editing value p1 may be acquired, or first correction information and a first editing value p1 may be acquired, instead of first setting information.

Similarly, a case has been described where, to calculate second setting information, which is information for correcting a sharpness reduction caused by the imaging apparatus 10 and a sharpness reduction caused by the image forming unit 209 (second image restoration information), second sharpness reduction information is used as information about image deterioration (a sharpness reduction) caused by the image forming unit 209 (second image deterioration information). Alternatively, second correction information may be used instead of the second sharpness reduction information.

In FIG. 5, the process of step S1 corresponds to the processing of the image sensor unit 101. The processes of step S2 to S4 correspond to the processing of the imaging UI unit 103. The process of step S6 corresponds to the processing of the first setting information calculation unit 105. The process of step S8 corresponds to the processing of the captured image processing unit 106. Further, the process of step S9 corresponds to the processing of the imaging information display unit 104. The processes of steps S10, S12, and S13 correspond to the processing of the data storage unit 107.

Further, in FIG. 9, the processes of steps S21, S23, S25, and S27 correspond to the processing of the data acquisition unit 201. The process of step S22 corresponds to the processing of the magnification processing unit 206. The processes of steps S24, S26, S28, and S29 correspond to the processing of the second setting information calculation unit 205. Further, the process of step S30 corresponds to the processing of the image formation processing unit 208. The process of step S31 corresponds to the processing of the image forming unit 209.

As described above, in the present exemplary embodiment, the image forming apparatus 20 acquires at least information about an image restoration process that can be performed during the process of generating a captured image captured by the imaging apparatus 10. Then, the image forming apparatus 20 performs correction according to MTF correction on the imaging apparatus 10 side. Thus, even if a captured image of which the sharpness is adjusted to various restoration states is input to the image forming apparatus 20, the image forming apparatus 20 can perform appropriate printing sharpness correction according to the degree of correction (restoration) of the sharpness reduction made by the imaging apparatus 10.

Specifically, the image forming apparatus 20 can acquire first image deterioration information about image deterioration caused by the imaging system of the imaging apparatus 10 (e.g., first sharpness reduction information), first image restoration information about an image restoration process that can be performed during the process of generating a captured image captured by the imaging apparatus 10 (e.g., first setting information), and second image deterioration information about image deterioration caused by the image forming unit 209 (e.g., second sharpness reduction information), or second correction information for correcting a sharpness reduction caused by the image forming unit 209. Then, based on these pieces of information, the image forming apparatus 20 sets second image restoration information (e.g., second setting information) for correcting the sharpness reduction of the image caused by the image capture unit and the sharpness reduction of the image caused by the image forming unit 209.

In this process, as illustrated in FIG. 12, the image forming apparatus 20 calculates as second setting information 1417 the result of performing inverse Fourier transform on the product of an inverse characteristic 1410 of first sharpness reduction information, an inverse characteristic 1405 of first setting information, and an inverse characteristic 1414 of second sharpness reduction information. That is, the image forming apparatus 20 sets as the second setting information 1417 the result of combining a first image restoration filter for correcting image deterioration caused by the imaging system, a cancellation filter for canceling an image restoration process performed during the process of generating a captured image, and a second image restoration filter for correcting image deterioration caused by the image forming unit.

Consequently, it is possible to correct the total of the sharpness reduction of the imaging apparatus 10 and the sharpness reduction of the image forming unit 209, regardless of the degree of correction (restoration) of the sharpness reduction made by the imaging apparatus 10. That is, in a case where an image restoration process for correcting the sharpness reduction of the imaging apparatus 10 in a half-finished manner is performed (for example, in a case where the first editing value p1=0.5), the image forming apparatus 20 can once cancel this half-finished correction using the inverse characteristic 1405 of the first setting information and correct the sharpness reduction of the imaging apparatus 10 using the inverse characteristic 1410 of the first sharpness reduction information.

In a case where, on the other hand, an image restoration process for correcting the sharpness reduction of the imaging apparatus 10 is performed (in a case where the first editing value p1=1.0), there is an inverse characteristic relationship between the inverse characteristic 1410 of the first sharpness reduction information and the inverse characteristic 1405 of the first setting information. Thus, as a result, the image forming apparatus 20 does not correct the sharpness reduction of the image capture unit, and can correct only the sharpness reduction of the image forming unit 209.

Further, to set the second setting information, the magnifications of the first sharpness reduction information and the first setting information are changed to print resolutions for use (1402, 1407). Thus, it is possible to set second setting information according to the magnification of the image forming unit 209.

In FIG. 12, the processes 1407 and 1409 correspond to examples of a first calculation unit. The processes 1402 and 1404 correspond to examples of a second calculation unit. The processes 1413 and 1416 correspond to examples of a third calculation unit. The processes 1411 and 1415 correspond to examples of a fourth calculation unit.

Further, if the imaging apparatus 10 does not perform an image restoration process, the image forming apparatus 20 can recognize this state based on second setting information. In such a case, it is not necessary to cancel the image restoration process performed by the imaging apparatus 10. Thus, as illustrated in FIG. 13, the image forming apparatus 20 calculates as second setting information 1511 the result of performing inverse Fourier transform on the product of an inverse characteristic 1505 of first sharpness reduction information and an inverse characteristic 1508 of second sharpness reduction information. That is, the image forming apparatus 20 sets the cancellation filter to 0 and sets as the second setting information 1511 the result of combining the first image restoration filter and the second image restoration filter. The image forming apparatus 20 can thus appropriately recognize whether the imaging apparatus 10 performs a correction (restoration) process on the sharpness reduction. In a case where the correction (restoration) process is not performed, it is possible to appropriately correct the sharpness reduction of the image capture unit.

Further, even if the image forming apparatus 20 cannot acquire first setting information, and the presence or absence of correction (restoration) of the sharpness reduction in the imaging apparatus 10 and the degree of the correction (restoration) cannot be specified, the image forming apparatus 20 sets second setting information taking into account the correction (restoration) process performed by the imaging apparatus 10. In such a case, as illustrated in FIG. 11, the image forming apparatus 20 calculates as second setting information 1313 the result of performing inverse Fourier transform on the product of a characteristic 1307 after adjustment is made to weaken an inverse characteristic 1305 of first sharpness reduction information, and an inverse characteristic 1310 of second sharpness reduction information. That is, the image forming apparatus 20 sets the cancellation filter to 0 and calculates the first image restoration filter to make the strength for correcting image deterioration caused by the imaging system smaller than when first setting information is acquired (FIGS. 12 and 13). Then, the image forming apparatus 20 sets as the second setting information 1313 the result of combining the first image restoration filter after adjustment and the second image restoration filter.

Consequently, it is possible to reduce overcorrection caused by doubly making correction when the imaging apparatus 10 corrects (restores) the sharpness reduction, and insufficient correction made when the imaging apparatus 10 does not correct (restore) the sharpness reduction.

Further, in such a case, the image forming apparatus 20 calculates the first image restoration filter such that the greater the magnification in the magnification process performed by the magnification processing unit 206, the smaller the strength of correction (restoration). For example, the image forming apparatus 20 may perform the calculation in such a manner that the greater the magnification change rate, the smaller the strength of correction. As described above, in the case of enlargement printing, in which it is easy to visually confirm image failure, the strength of correction (restoration) is made smaller than in the case of reduction printing, in which it is difficult to visually confirm image failure. Consequently, it is possible to obtain a suitable printed product.

In the first exemplary embodiment, the second setting information for restoring sharpness is calculated using the first setting information and the first sharpness reduction information. In a second exemplary embodiment, a detailed description is given of an example where sharpness is restored without using the first sharpness reduction information.

In the first exemplary embodiment, based on the first editing value p1 and the first correction information h(x,y), the first setting information calculation unit 105 calculates the first setting information g(x,y) for use in the process of actually correcting (restoring) the sharpness reduction (hereinafter referred to also as an "image restoration process"). Further, as the first setting information, a set of the first editing value p1 and the first setting information g(x,y) may be held. Alternatively, as the first setting information, the first correction information h(x,y) may be held instead of the spatial filter coefficient g(x,y).

In the present exemplary embodiment, an example is described where as the first setting information, a set of the first correction information h(x,y) and the first editing value p1 is held. That is, in g(x,y)=h(x,y)×p1+dlt(x,y) represented by formula (1), the first correction information h(x,y) and the first editing value p1 are held as the first setting information. Since dlt(x,y) is a fixed value, it is not necessary to explicitly hold dlt(x,y).

The example of the holding of this combination is merely illustrative. Alternatively, another combination may be held.

(Image Processing Procedure by Image Forming Apparatus 20)

Figure 15:
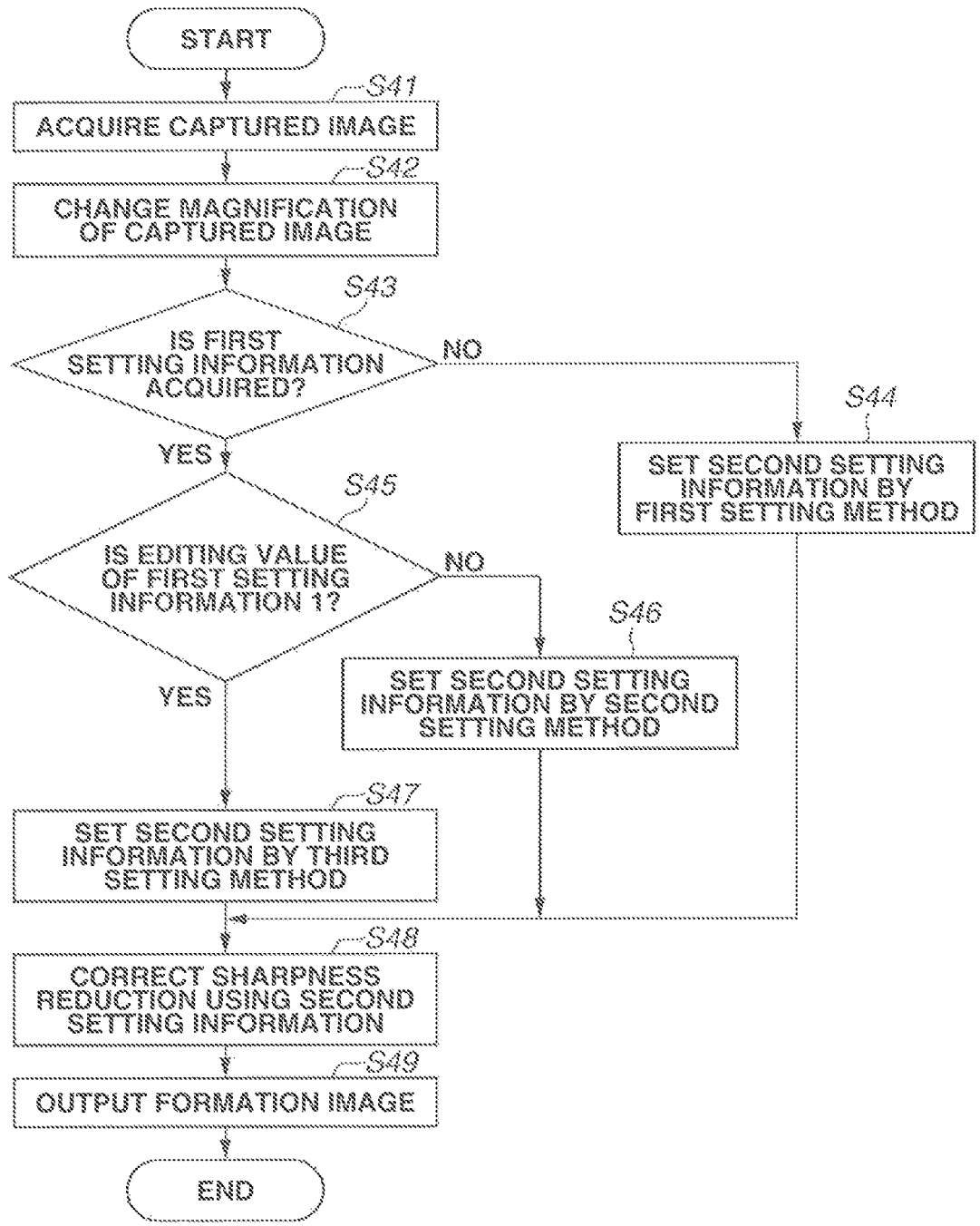
FIG. 15 is a flowchart illustrating an example of an image processing procedure for sharpness restoration.

FIG. 15 is a flowchart illustrating an example of an image processing procedure for sharpness restoration. The above flowchart corresponds to the flowchart in FIG. 9 described in the first exemplary embodiment. In the present exemplary embodiment, the configuration is similar to that of the first exemplary embodiment except for the flowchart in FIG. 15, and therefore, the similar configuration is not described below.

In step S41, the image forming apparatus 20 acquires a captured image from the imaging apparatus 10, and the processing proceeds to step S42.

In step S42, the image forming apparatus 20 changes the magnification of the captured image acquired in step S21 to the resolution for print.

In step S42, similarly to the first exemplary embodiment, the image forming apparatus 20 acquires information about the output size specified by the user through the formation UI unit 203 and performs the above magnification process based on a magnification according to the indicated output size. The captured image of which the magnification is changed is once held in the formation data memory.

In step S43, the image forming apparatus 20 determines whether first setting information corresponding to the captured image acquired in step S41 is acquired. Then, in a case where it is determined that the first setting information (a first editing value p1 and first correction information h(x,y)) is not acquired, the processing proceeds to step S44. In a case where it is determined that the first setting information is acquired, the processing proceeds to step S45.

In step S44, based on second sharpness reduction information, which is information indicating the sharpness reduction of the image forming unit 209, the image forming apparatus 20 calculates second setting information k(x,y) (a first setting method). Since the first setting information (at what degree the sharpness reduction is corrected by the imaging apparatus 10) cannot be specified, in step S44, the image forming apparatus 20 calculates second setting information k(x,y) for correcting the sharpness reduction of the image forming unit 209. This process is similar to that of step S24 (FIG. 10) in the first exemplary embodiment.

In this process, the second setting information may not need to be the very inverse characteristic 1203 of information indicating the sharpness reduction of the image forming unit 209, and may only need to be information set according to the characteristic of sharpness reduction to restore the reduced sharpness. For example, the second setting information may be a characteristic obtained by multiplying the inverse characteristic of sharpness reduction information by an adjustment rate. It is desirable that the adjustment rate should be a neighborhood of 1.

Further, as illustrated in the first exemplary embodiment, in a case where the first setting information (the first editing value p1 and the first correction information h(x,y)) cannot be specified, based on the magnification change rate to print resolution (enlargement ratio) or a spatial frequency characteristic, the adjustment rate of restoration may be determined. Further, further correction of the sharpness reduction may be added insomuch that image failure does not occur.

In step S45 in FIG. 15, the image forming apparatus 20 determines whether the first editing value p1 in the acquired first setting information is 1. Then, in a case where it is determined that the first editing value p1 in the first setting information is not 1, the processing proceeds to step S46. In a case where it is determined that the first editing value p1 in the first setting information is 1, the processing proceeds to step S47.

Figure 16:
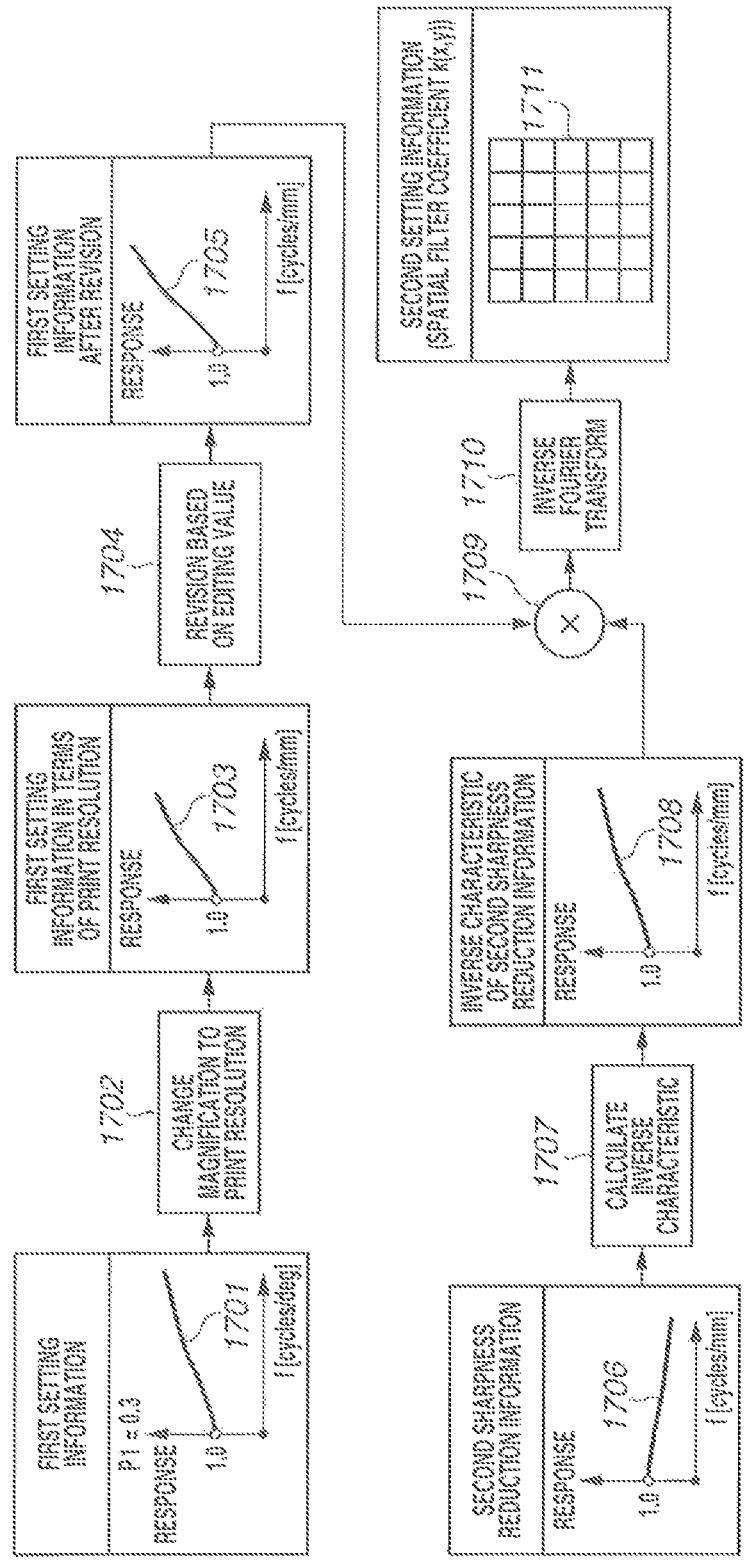
FIG. 16 is a diagram illustrating a second setting method performed in step S46.

In step S46, based on second sharpness reduction information, which is information indicating the sharpness reduction of the image forming unit 209, and the first setting information (h(x,y), p1), the image forming apparatus 20 calculates second setting information k(x,y) (a second setting method). In step S46, based on the first editing value p1 in the first setting information, the image forming apparatus 20 calculates second setting information for correcting the total of the sharpness reduction of the imaging apparatus 10 and the sharpness reduction of the image forming unit 209. FIG. 16 is a block diagram illustrating the second setting method performed in step S46.

As illustrated in FIG. 16, first, the image forming apparatus 20 performs a magnification process 1702 on first setting information 1701, which is provided as a spatial frequency characteristic. In the magnification process 1702, the image forming apparatus 20 performs the process of changing the axis of the spatial frequency from "[cycles/degree]" to "[cycles/mm]" to correspond to the magnification changed in step S42. Consequently, the image forming apparatus 20 obtains first setting information 1703 in terms of print resolution.

Next, the image forming apparatus 20 performs a revision process 1704 based on the first editing value p1 on the first setting information 1703, which is represented by a spatial frequency characteristic. In the revision process 1704, in the case of the first editing value p1, the image forming apparatus 20 performs a revision process for multiplying the first correction information h(x,y) by (1−p1).

For example, if p1 is 0.3, a revision process for multiplying the first correction information h(x,y) by 1−0.3=0.7. That is, it is already known that the captured image is corrected by 0.3 times as much as the first correction information h(x,y). Thus, by newly correcting the captured image by 0.7 times as much as the first correction information h(x,y), it is possible to correct the captured image by the first correction information h(x,y).

In the above example, a revision process using h(x,y) has been illustrated. Alternatively, it is also possible to perform a revision process using g(x,y). The image forming apparatus 20 performs the revision process 1704 to obtain first setting information 1705 after revision. The first setting information 1705 after revision is information for correcting the sharpness reduction of the image capture unit.

Meanwhile, to correct the sharpness reduction of the image forming unit 209, the image forming apparatus 20 performs a process similar to that of the first setting method illustrated in FIG. 10. That is, the image forming apparatus 20 performs an inverse characteristic calculation process 1707 on second sharpness reduction information 1706, which is provided as a spatial frequency characteristic, thereby obtaining an inverse characteristic 1708 of the second sharpness reduction information. The inverse characteristic 1708 is information for correcting the sharpness reduction of the image forming unit 209.

It is possible to achieve a similar function also by holding, in advance, correction information for correcting the sharpness reduction, but not by acquiring the second sharpness reduction information 1706.

Next, the image forming apparatus 20 obtains a product 1709 of the inverse characteristic 1708 and the information for correcting the sharpness reduction of the imaging apparatus 10. Then, the image forming apparatus 20 performs an inverse Fourier transform process 1710 on the resulting frequency characteristic, thereby obtaining a spatial filter coefficient k(x,y) 1711. The spatial filter coefficient k(x,y) is second setting information for correcting the total of the sharpness reduction of the imaging apparatus 10 and the sharpness reduction of the image forming unit 209.

Further, the enlargement ratio for changing the magnification to print resolution, a spatial frequency characteristic, or the adjustment rate of restoration may be determined.

In a case where it is determined the first editing value p1 in the first setting information is not 1, the processing proceeds to step S46. In a case where it is determined that the first editing value p1 in the first setting information is 1, the processing proceeds to step S47.

Next, in step S47 in FIG. 15, based on second sharpness reduction information, which is information indicating the sharpness reduction of the image forming unit 209, and the first setting information (h(x,y), p1), the image forming apparatus 20 calculates second setting information k(x,y) (a third setting method). The process of step S47 is different from the process of step S46 in that in the process of step S47, the first setting information is 1, and sufficient correction is made. Thus, it is not necessary to perform a revision process. That is, in step S47, the image forming apparatus 20 simply calculates second setting information for correcting the sharpness reduction of the image forming unit 209. This process is similar to that of step S24 (FIG. 10) in the first exemplary embodiment.

Further, the enlargement ratio for changing the magnification to print resolution, a spatial frequency characteristic, or the adjustment rate of restoration may be determined.

Next, in step S48 in FIG. 15, the image forming apparatus 20 generates a formation image including formation images rp, gp, and bp, using the second setting information k(x,y) calculated by any one of the first to third setting methods. Consequently, even if the first sharpness reduction information of the imaging apparatus 10 cannot be specified, it is possible to suitably correct the sharpness reduction. That is, the image forming apparatus 20 performs the revision process 1704 based on the first editing value p1. In the revision process, in the case of the first editing value p1, a revision process for multiplying c by (1−p1) can avoid half-finished correction based on the first setting information.

As described above, according to the present exemplary embodiment, the image forming apparatus 20 can acquire, as first image information, first image restoration information about the image restoration process that is possibly performed by the imaging system, and the editing value indicating the degree of restoration of image deterioration caused by the imaging system. More specifically, the image forming apparatus 20 can acquire, as the first setting information, the first correction information h(x,y) and the first editing value p1. Then, the image forming apparatus 20 sets image restoration information (for example, second setting information) based on such information. In this process, as illustrated in FIG. 16, the image forming apparatus 20 calculates, as the second setting information (1711), a result obtained by inverse Fourier transform performed on the product of the characteristic which is obtained by revising the first setting information based on the first editing value p1 (1705), and the inverse characteristic of the second sharpness reduction information (1711). More specifically, the image forming apparatus 20 calculates the first image restoration filter for correcting insufficient restoration performed in the imaging system for the image deterioration caused by the imaging system and the second image restoration filter for correcting the image deterioration caused by the image forming system. Then, the image forming apparatus 20 sets the result of combination of those two filters as the second setting information (1711).

Thus, the image forming apparatus 20 can appropriately correct the sharpness reduction of the imaging apparatus 10, even if the image forming apparatus 20 cannot specify the sharpness reduction information of the imaging apparatus 10. More specifically, the image forming apparatus 20 can correct the half-finished restoration process performed in the imaging apparatus 10 by performing the revision process in which the first correction information h(x,y) is multiplied by (1−p1).

In the first and second exemplary embodiments, a method for acquiring at least the first setting information as information for correcting the optical sharpness reduction of the image capture unit, and using the first setting information to restore the sharpness has been illustrated. In a third exemplary embodiment, a description is given of a method for correcting a sharpness reduction using, as information for correcting the optical sharpness reduction of the image capture unit, additional information, such as the focus position, the stop (the f-value), the focal length, position information of an image (the image height or the distance from the center of the image), the stitch size (the number of connected images), the surface shape, or gloss (polarization) information. The additional information is a parameter for capturing an image in the image capture unit and is information correlated with the sharpness of a captured image. Hereinafter, the additional information is third setting information.

(Image Processing Procedure by Image Forming Apparatus 20)

Figure 17:
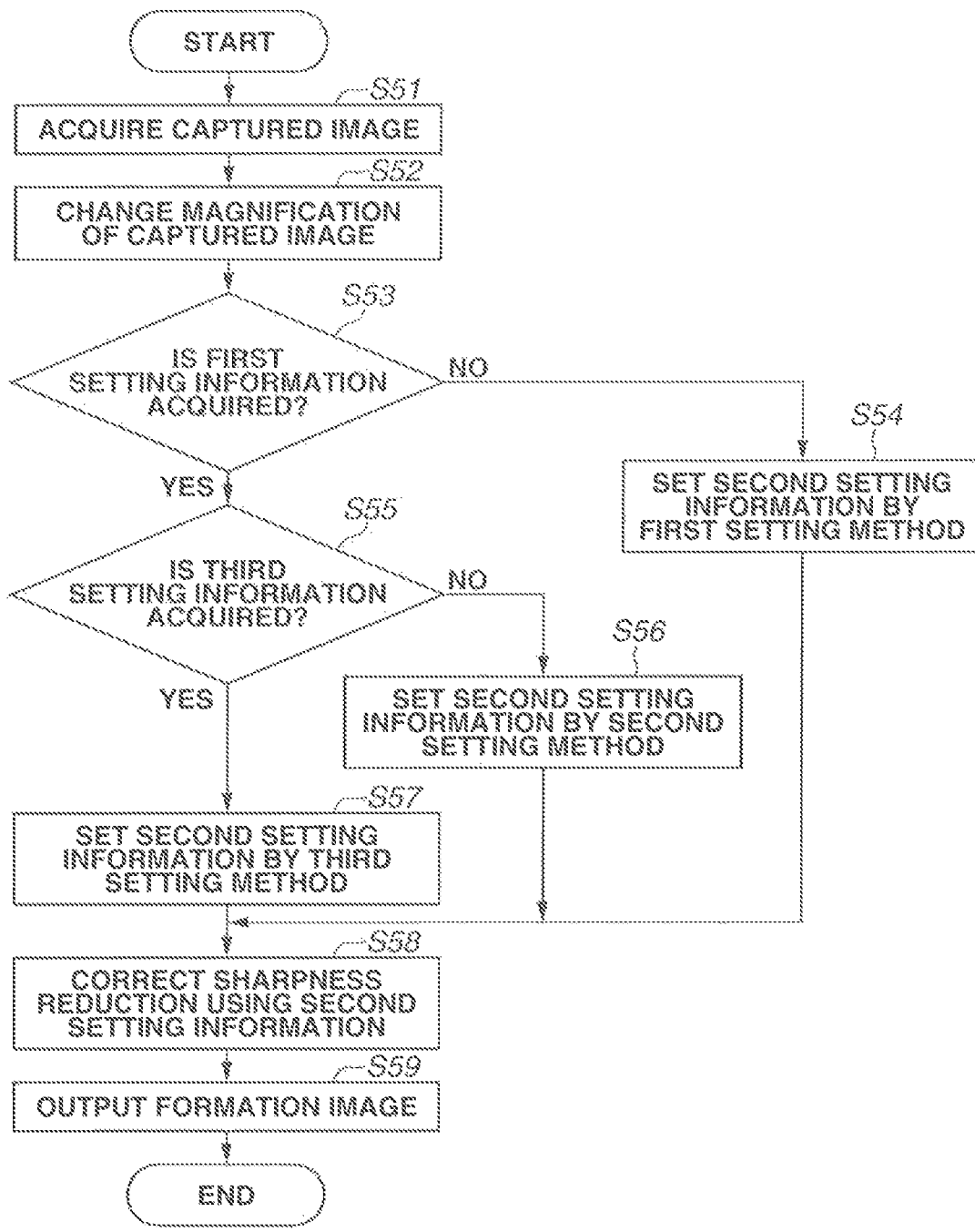
FIG. 17 is a flowchart illustrating an example of an image processing procedure for sharpness restoration taking into account third setting information.

FIG. 17 is a flowchart illustrating an example of an image processing procedure for suitable sharpness restoration taking into account the third setting information. The image processing procedure illustrated in FIG. 17 is realized in such a manner that a CPU included in the image forming apparatus 20 reads out and executes a predetermined program. The above flowchart corresponds to the flowchart in FIG. 9 described in the first exemplary embodiment. In the present exemplary embodiment, the configuration is similar to that of the first exemplary embodiment except for the flowchart in FIG. 17, and therefore, the similar configuration is not described here.

Examples of the third setting information can include at least the focus position, the stop (the f-value), the focal length, position information of an image (the image height or the distance from the center of the image), the stitch size (the number of connected images), the surface shape, and gloss (polarization) information. The following description is given using the focus position as the third setting information.

Steps S51 to S54 are similar to steps S41 to 44 in the second exemplary embodiment and therefore are not described in detail below.

First, in step S55 in FIG. 17, the image forming apparatus 20 determines whether third setting information corresponding to the captured image acquired in step S51 is acquired. Then, in a case where it is determined that the third setting information is not acquired, the processing proceeds to step S56. In a case where it is determined that the third setting information is acquired, the processing proceeds to step S57.

The image forming apparatus 20 determines whether as the third setting information in the present exemplary embodiment, focus information fcs in the captured image is acquired. The focus information fcs is information about at which position the captured image is brought into focus. It is assumed that the focus information fcs is set such that in an area having the same image size as that of the captured image (having the same resolution as that of the captured image), a focused state is 1, and an unfocused state is 0. For example, if the entirety of the image is in focus, the value of the entirety of the image is set to 1. If only part of the image is in focus, the value of only the partial area is set to 1.

In the above example, an example has been illustrated where an area having the same image size as that of the captured image is set. Alternatively, an area having a size smaller than that of the captured image may be set.

Further, in the above example, an example has been illustrated where the focus information fcs is set in a binary manner (1 bit), which indicates a focused state or an unfocused state. Alternatively, the focus information fcs may be set in a multivalued manner (e.g., 8 bits) according to the degree of focus.

In step S56, based on second sharpness reduction information, which is information indicating the sharpness reduction of the image forming unit 209, and the first setting information (h(x,y), p1), the image forming apparatus 20 calculates second setting information k(x,y) (a second setting method). In step S56, based on the editing value p1 in the first setting information, the image forming apparatus 20 calculates second setting information for correcting the total of the sharpness reduction of the imaging apparatus 10 and the sharpness reduction of the image forming unit 209.

Step S56 is similar to step S46 in the second exemplary embodiment and therefore is not described in detail below.

In step S57, based on second sharpness reduction information, which is information indicating the sharpness reduction of the image forming unit 209, the first setting information (h(x,y), p1), and third setting information (the focus information fcs), the image forming apparatus 20 calculates second setting information k(x,y) (a third setting method).

In step S57, based on third setting information (the focus information fcs) and the editing value p1 in the first setting information, the image forming apparatus 20 calculates second setting information for correcting the total of the sharpness reduction of the imaging apparatus 10 and the sharpness reduction of the image forming unit 209.

Figure 18:
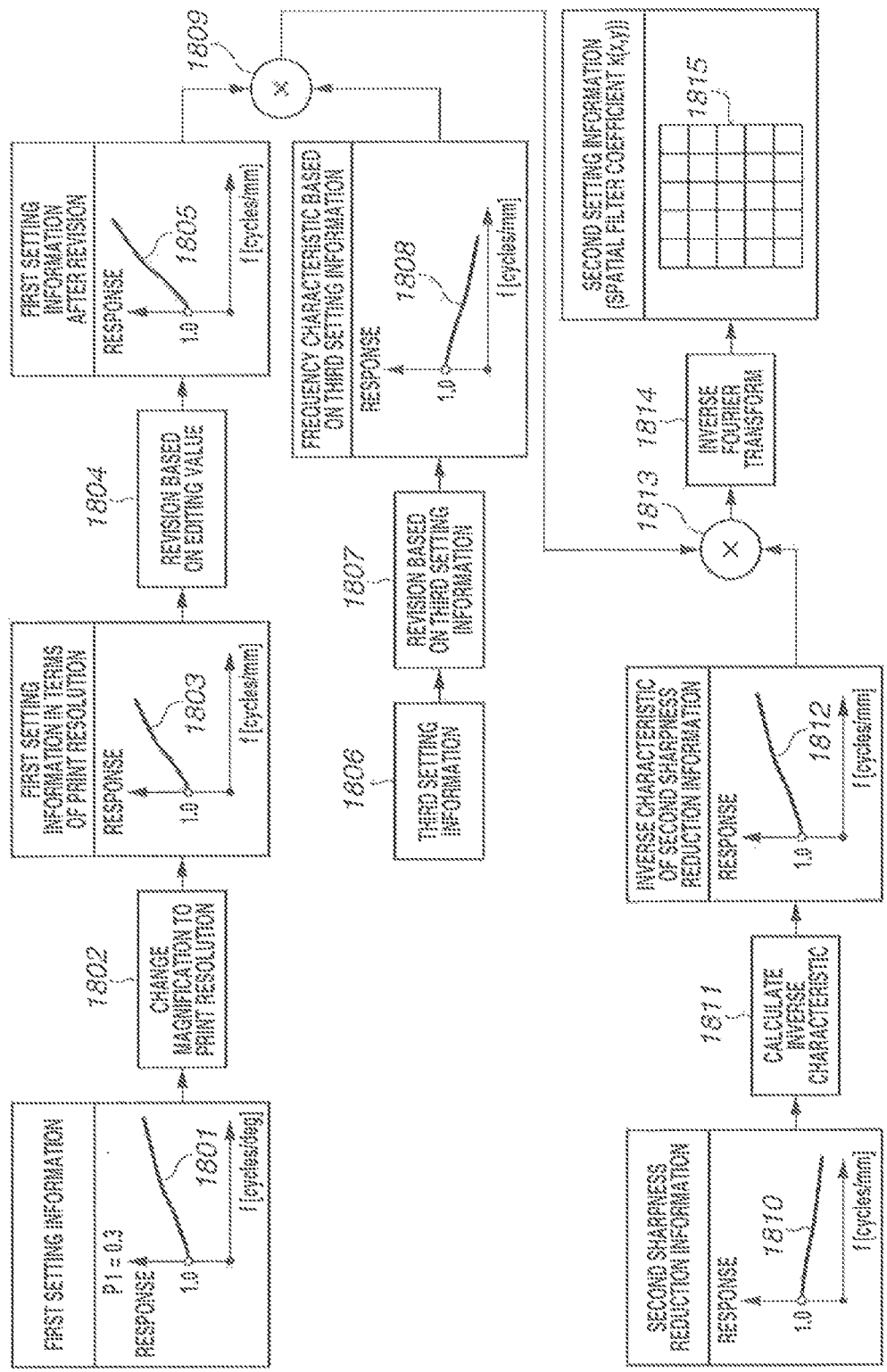
FIG. 18 is a diagram illustrating a third setting method performed in step S57.

FIG. 18 is a block diagram illustrating the third setting method performed in step S57.

As illustrated in FIG. 18, first, the image forming apparatus 20 performs a magnification process 1802 on first setting information 1801, which is provided as a spatial frequency characteristic. In the magnification process 1802, the image forming apparatus 20 performs the process of changing the axis of the spatial frequency from "[cycles/degree]" and "[cycles/mm]" to correspond to the magnification changed in step S52. Consequently, the image forming apparatus 20 obtains first setting information 1803 in terms of print resolution.

Next, similarly to the process performed in step S47, the image forming apparatus 20 performs a revision process 1804 based on the editing value p1 on the first setting information 1803, which is represented by a spatial frequency characteristic. In the revision process 1804, in the case of the editing value p1, the image forming apparatus 20 performs a revision process for multiplying c by (1−p1). In the above example, a revision process using h(x,y) has been described. Alternatively, it is also possible to perform a revision process using g(x,y).

The image forming apparatus 20 performs the revision process 1804 to obtain first setting information 1805 after revision. The first setting information 1805 after revision is information for correcting the sharpness reduction of the image capture unit.

Meanwhile, the image forming apparatus 20 also performs a revision process 1807 based on third setting information 1806. In the present exemplary embodiment, as the third setting information 1806, focus information fcs in the captured image is used. The focus information fcs is information about at which position the captured image is brought into focus (a focused state is 1, and an unfocused state is 0).

In the revision process 1807 based on the third setting information, in an area where fcs is 0 (an unfocused state), the image forming apparatus 20 performs the process of reducing the sharpness or the process of not restoring the sharpness.

The above process is a process in an area where fcs is 0 (an unfocused state). However, in an area where fcs is 1 (a focused state), the image forming apparatus 20 may perform the process of further improving the sharpness. Alternatively, the image forming apparatus 20 may perform in combination the process of reducing the sharpness in an area where fcs is 0 (an unfocused state), and the process of improving the sharpness in an area where fcs is 1 (a focused state). In any case, according to the focus information fcs of each area, the sharpness is restored or reduced. In an unfocused area, the image forming apparatus performs a sharpness restoration process on the assumption that the user does not wish to improve the sharpness.

In the above case, the focus information fcs is set in a binary manner (1 bit), which indicates 0 or 1. Thus, two types of processes including sharpness restoration (improvement) and sharpness reduction are performed. Alternatively, if the focus information fcs is set in a multivalued manner (e.g., 8 bits), the strengths of sharpness restoration (improvement) and sharpness reduction may be set according to the value of the focus information fcs.

In the revision process 1807, a frequency characteristic 1808 based on the third setting information is determined. The frequency characteristic 1808 corresponds to the focus information fcs and therefore changes in each area. Then, the image forming apparatus 20 obtains a product 1809 of the first setting information 1805 after revision and the frequency characteristic 1808 based on the third setting information. The thus obtained spatial frequency characteristic is information for performing correction based on the first setting information and the third setting information.

Meanwhile, to correct the sharpness reduction of the image forming unit 209, the image forming apparatus 20 performs a process similar to that of the first setting method illustrated in FIG. 10. That is, the image forming apparatus 20 performs an inverse characteristic calculation process 1811 on second sharpness reduction information 1810, which is provided as a spatial frequency characteristic, thereby obtaining an inverse characteristic 1812 of the second sharpness reduction information. The inverse characteristic 1812 is information for correcting the sharpness reduction of the image forming unit 209. It is possible to achieve a similar function also by holding, in advance, correction information for correcting the sharpness reduction, instead of acquiring the second sharpness reduction information 1810 to generate correction information. In this process, the correction information is not limited to the very inverse characteristic 1812 of the second sharpness reduction information, and may only need to be information for restoring the sharpness based on an inverse characteristic.

Next, the image forming apparatus 20 obtains a product 1813 of the inverse characteristic 1812 and the information for correcting the sharpness reduction of the imaging apparatus 10. Then, the image forming apparatus 20 performs an inverse Fourier transform process 1814 on the resulting frequency characteristic, thereby obtaining a spatial filter coefficient k(x,y) 1815. The spatial filter coefficient k(x,y) is second setting information for suitably correcting the total of the sharpness reduction of the imaging apparatus 10, the sharpness reduction of the image forming unit 209, and the additional information that varies in each area. In the above example, a method for performing correction based on the focus information fcs as the additional information of image capturing has been described. However, a target to be treated in the present exemplary embodiment is not limited to the focus information fcs. For example, as the third setting information, the strength of sharpness restoration (improvement) may be set based on the magnitude of a stop value (f-value) fnum. For example, in the case of the stop value fnum, the sharpness of the entirety of an image is improved by stopping down the lens. Thus, in a case where the stop value fnum is great, it is considered that the user intends to improve the sharpness of the image. Thus, a process may be performed such that the greater the stop value fnum, the greater the amount of correction of the sharpness.

Further, the focus information fcs and the stop value (f-value) fnum may be combined together. Specifically, in a case where a photographer captures an image by reducing the stop value fnum, it is considered that the photographer intends to further reduce the sharpness of the image in an area where the information fcs is 0 (an unfocused state). In response, a process may be performed such that in an area where the stop value fnum is small and the focus information fcs is 0 (an unfocused state), the sharpness is further reduced.

Further, as the third setting information, the focal length can also be used. The focal length also has an effect similar to that of the stop value fnum. For example, there is a tendency that the greater the focal length, the more reduced the sharpness of an area where the focus information fcs is 0 (an unfocused state). In response, a process may be performed such that in an area where the focal length is great (distant) and the focus information fcs is 0 (an unfocused state), the sharpness is further reduced.

Further, the strength of sharpness restoration (improvement) may be set according to the image height of the image (the distance from the center of the image). In an image, there is a tendency that the closer to the center of the screen, the more likely that the image is in focus, and the higher the sharpness. On the other hand, there is also a tendency that the further away from the center of the image, the more reduced the sharpness, due to aberration. In response, a process may be performed such that the greater the image height (the distance from the center of the image), the more improved the sharpness.

In a case where, however, image joint (connection or stitch) photographing is performed, it is not possible to simply calculate the degree of improvement of sharpness only from the image height (the distance from the center of the image). Joined images have a plurality of image centers. Thus, a sharpness improvement process may be performed taking into account the feature amount (the numbers of connected images in the vertical and horizontal directions, the position, and the size) of the stitch image. Further, in recent years, there is a camera that can acquire an image together with the surface roughness distribution and the gloss distribution. Such additional information that varies in each location may be used. For example, a sharpness improvement process may be performed such that the stronger the contrast in the surface roughness distribution (the greater the roughness), the stronger the process of the sharpness restoration. This is because an improvement in the texture of a captured image can be obtained if the more noticeable the surface roughness of the area, the more improved the sharpness. For a similar reason, a process may be performed such that the stronger the contrast in the gloss distribution, the more improved the sharpness.

Similarly, the strength of sharpness restoration (improvement) may be set based on the image height of a surface roughness image (the distance from the center of the image). In an image, there is a tendency that the closer to the center of the screen, the more likely that the image is in focus. There is also a tendency that the further away from the center of the image, the more reduced the sharpness, due to aberration. In response, a process may be performed such that the greater the image height (the distance from the center of the image), the more improved the sharpness. It is possible to obtain the gloss distribution by capturing a gloss image and a matte image using a polarization filter, and obtaining the gloss distribution from the difference between the images.

As described above, in the present exemplary embodiment, it is possible to suitably correct the sharpness reduction using additional information different from the first setting information. As the additional information, for example, the focus position, the stop (the f-value), the focal length, position information of an image (the image height or the distance from the center of the image), the stitch size (the number of connected images), the surface shape, or gloss (polarization) information can be utilized.

In the above exemplary embodiments, a case has been described where, in a case where first sharpness reduction information is not acquired (No in step S23 in FIG. 9), the image forming apparatus 20 sets second setting information based only on second sharpness reduction information. Alternatively, even if the first sharpness reduction information is not acquired, but in a case where first setting information is acquired, the image forming apparatus 20 may set second setting information based on the first setting information.

In such a case, the second setting information may be set to be proportional to the first setting information. For example, the image forming apparatus 20 may perform inverse Fourier transform on first setting information provided as a spatial frequency characteristic, thereby calculating an image restoration filter (a third image restoration filter) used in the image restoration process performed by the imaging apparatus 10. Then, the image forming apparatus 20 may set as second setting information an image restoration filter (a fourth image restoration filter) having an image restoration strength proportional to the image restoration strength of the third image restoration filter.

Further, in such a case, for example, in a case where the first setting information is equal to or greater than a predetermined value, the second setting information may be set to be a certain value. That is, in a case where the image restoration strength of the third image restoration filter is equal to or greater than a predetermined value, the image restoration strength of the fourth image restoration filter may be set to be a certain value. Further, in the above exemplary embodiments, a case has been described where second setting information is automatically calculated according to first setting information, first sharpness reduction information, and second sharpness reduction information, and then, a sharpness reduction is corrected. Alternatively, the configuration may be such that the user can adjust second setting information.

For example, information (the default value of a spatial filter coefficient) set in advance for correcting image deterioration (a sharpness reduction) caused by the image forming unit 209 may be edited according to an instruction from the user (for example, an editing strength) and calculated as the final second setting information. In this case, an editing restriction according to the first setting information (or the first editing value p1) is provided on the editing strength. Thus, it is possible to set second setting information according to the degree of the image restoration process performed by the imaging apparatus 10.

Further, the above default value may be set based on second sharpness reduction information. In this case, second setting information (the spatial filter coefficient 1205 in FIG. 10) for correcting the sharpness reduction of the image forming unit 209 may be set as a default value. This variation is specifically described below.

The amount of adjustment of the second setting information is configured such that the user can indicate the amount of adjustment as a second editing value p2, using a user interface. At this time, an editing restriction according to the first setting information (or the first editing value p1) is provided on the second editing value p2. That is, the default value of the second setting information can be edited in an editing-allowed range that changes according to the first setting information (or the first editing value p1).

Figure 14:
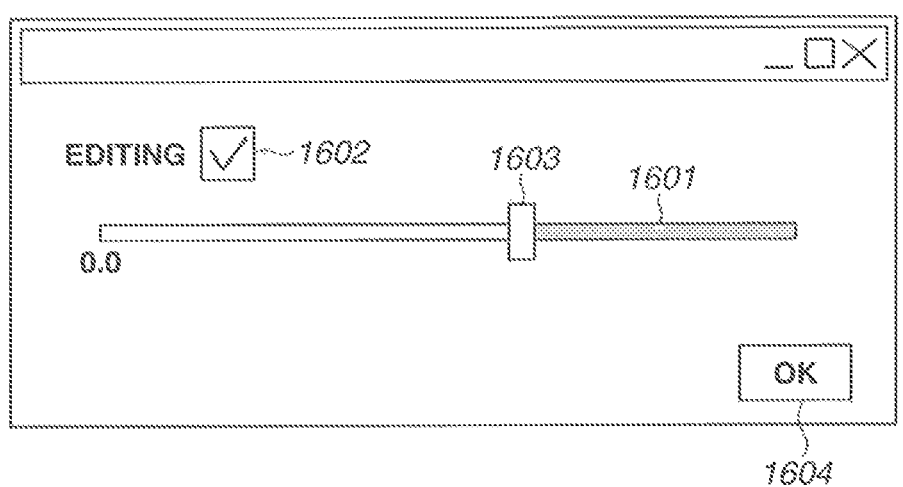
FIG. 14 is an example of display of an editing-prohibited area of a second editing value.

For example, as illustrated in FIG. 14, the second editing value p2, which is indicated by the user, may be input through an editing screen displayed by the formation information display unit 204. In this process, an editing-prohibited range 1601 of the second editing value p2 may be highlighted to be visually clarified. Then, for example, when the user checks an "editing" button 1602, changes the position of a slide bar 1603 from a default position, and presses an "OK" button 1604 on the editing screen illustrated in FIG. 14, the image forming apparatus acquires through the formation UI unit 203 a value indicated by the slide bar 1604 at that point of time.

The editing-prohibited range 1601 is set such that the greater the amount of correction of the sharpness reduction of the imaging apparatus 10 (the greater the first setting information or the first editing value p1), the wider the range. That is, the editing-prohibited range 1601 is set such that the greater the amount of correction of the sharpness reduction of the imaging apparatus 10, the smaller the upper limit of the second editing value p2.

For example, the range where the total of the first editing value p1 and the second editing value p2 exceeds a predetermined value (for example, 1.7) is set as the editing-prohibited range 1601. That is, in a case where the first editing value p1=0.5, the upper limit of the second editing value p2 is set to 1.2. In a case where the first editing value p1=0.0, the upper limit of the second editing value p2 is set to 1.7.

In this process, the upper limit of the second editing value p2 is set according to the first editing value p1, and first sharpness reduction information cannot be specified. In response, a total value p1+p2 is set to 1.7, so that even if the degree of sharpness reduction of the imaging apparatus 10 is relatively small, it is possible to reduce image failure without making overcorrection, and so that even if the degree of sharpness reduction of the imaging apparatus 10 is relatively great, it is possible to somewhat restore the sharpness reduction.

The range where the total value p1+p2 exceeds 1.7 is set as the editing-prohibited range 1601. The value, however, is not limited to 1.7, and may be 1.5, 2.0, or 3.0, for example. As described above, the upper limit of the second editing value p2 is set, whereby it is possible to prevent overcorrection caused by the fact that the user sets the second editing value p2 to be too large.

Further, to prevent the overcorrection more certainly, for example, if the user changes the slide bar 1603 to set the second editing value p2 to a value within the editing-prohibited range 1601, a warning may be displayed, or a warning sound may be emitted.

In a case where the default value of the second setting information is defined as q(x,y), second setting information q2(x,y) after editing is represented by the following formula using the second editing value p2 (≥0). It is assumed that q in the above example is set based only on second sharpness reduction information (in this case, the sharpness reduction of the image forming unit 209 is corrected).

$$q2(x,y)=q(x,y) \times p2 \qquad (8)$$

That is, the smaller the value of the second editing value p2, the smaller the second setting information q2 after editing, as the strength of correction.

As described above, in the processing on the image forming apparatus 20 side, the user can adjust the degree of correction of the sharpness reduction. Thus, it is possible to achieve appropriate printing sharpness restoration.

A case has been described where the upper limit of the second editing value p2 is set according to the first editing value p1. This information, however, may only need to allow the recognizing of the degree of the image restoration process performed by the imaging apparatus 10. Alternatively, the upper limit of the second editing value p2 may be set using the first setting information or the first sharpness reduction information.

Further, in the above exemplary embodiments, a case has been described where the image processing apparatus 20A is provided in the image forming apparatus 20. Alternatively, the image processing apparatus 20A may be provided in another apparatus. For example, the present invention is also applicable to an image processing system in which the imaging apparatus 10 and an apparatus in which the image processing apparatus 20A is provided are connected together so that the imaging apparatus 10 and the apparatus can communicate with each other, and the apparatus in which the image processing apparatus 20A is provided and an image forming apparatus including the image forming unit 209 are connected together so that the apparatus and the image forming apparatus can communicate with each other.

According to the present invention, in a case where an image forming apparatus outputs a captured image input from an imaging apparatus, and even if the captured image adjusted to various restoration states is input from the imaging apparatus, it is possible to perform image restoration appropriate for output from the image forming apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-212997, filed Oct. 17, 2014, and No. 2015-175837, filed Sep. 7, 2015, which are hereby incorporated by reference herein in their entirety.

What is claimed is:
1. An image processing apparatus comprising:
a first acquisition unit configured to acquire a captured image captured by an imaging system;
a second acquisition unit configured to acquire first image information about a sharpness reduction that occurs in the captured image and is caused by the imaging system;

a specifying unit configured to specify a restoration process according to the first image information on the captured image and;

a third acquisition unit configured to acquire second image information about a sharpness reduction caused by an image forming system for forming an image on a recording medium based on the captured image;

a setting unit configured to, based on the first image information and the second image information, set image restoration information for correcting at least one of the sharpness reduction caused by the imaging system and the sharpness reduction caused by the image forming system; and a correction unit configured to correct the captured image by a restoration process using the image restoration information, wherein the setting unit sets the image restoration information according to a result of the specifying unit specifying the restoration process.

2. The image processing apparatus according to claim 1, wherein the second acquisition unit acquires, as the first image information, first image restoration information about an image restoration process that is possibly performed by the imaging system, and first image deterioration information about image deterioration caused by the imaging system, and wherein the setting unit sets the image restoration information based on the first image restoration information, the first image deterioration information, and the second image information.

3. The image processing apparatus according to claim 2, wherein the setting unit comprises:

a first calculation unit configured to, based on the first image deterioration information acquired by the second acquisition unit, calculate a first image restoration filter for correcting the image deterioration caused by the imaging system;

a second calculation unit configured to, based on the first image restoration information acquired by the second acquisition unit, calculate a cancellation filter for canceling an image restoration process performed by the imaging system;

a third calculation unit configured to, based on the second image information, calculate a second image restoration filter for correcting image deterioration caused by the image forming system; and a fourth calculation unit configured to combine the first image restoration filter calculated by the first calculation unit, the cancellation filter calculated by the second calculation unit, and the second image restoration filter calculated by the third calculation unit, and obtain a result of the combination as the image restoration information.

4. The image processing apparatus according to claim 3, wherein the specifying unit determines whether an image restoration process is performed by the imaging system, and wherein in a case where the specifying unit determines that the image restoration process is not performed, the second calculation unit calculates the cancellation filter to be 0.

5. The image processing apparatus according to claim 3, further comprising a determination unit configured to determine whether the second acquisition unit acquires the first image deterioration information and the first image restoration information, wherein in a case where the determination unit determines that the first image deterioration information is acquired and the first image restoration information is not acquired, the first calculation unit calculates the first image restoration filter in such a manner that a strength for correcting the image deterioration caused by the imaging system becomes smaller than the strength in a case where the first image restoration information is acquired, and the second calculation unit calculates the cancellation filter to be 0.

6. The image processing apparatus according to claim 1, wherein the second acquisition unit acquires as the first image information the first image restoration information and a first editing value indicating a degree of restoration of image deterioration caused by the imaging system, and wherein the setting unit sets the image restoration information based on the first image restoration information, the first editing value, and the second image restoration information.

7. The image processing apparatus according to claim 6, wherein the setting unit comprises:

a first calculation unit configured to, based on the first image restoration information and the first editing value, calculate a first revision image restoration filter revised to correct the image deterioration caused by the imaging system;

a second calculation unit configured to, based on the second image information, calculate a second image restoration filter for correcting image deterioration caused by the image forming system; and a third calculation unit configured to combine the first revision image restoration filter calculated by the first calculation unit and the second image restoration filter calculated by the second calculation unit, and obtain a result of the combination as the image restoration information.

8. The image processing apparatus according to claim 6, wherein the second acquisition unit further acquires first additional information, and wherein the setting unit sets the image restoration information based on the first image restoration information, the first editing value, the first additional information, and the second image restoration information.

9. The image processing apparatus according to claim 8, wherein the first additional information is any of a focus position, a stop (an f-value), a focal length, position information of an image, a number of connected images, a surface shape, and gloss information.

10. The image processing apparatus according to claim 3, wherein the correction unit comprises a magnification unit configured to change a magnification of the captured image by a magnification according to an output size of an image in the image forming system, and is configured to correct, by the image restoration process, the captured image of which the magnification is changed by the magnification unit, and wherein the first calculation unit calculates the first image restoration filter in such a manner that a strength of the first image restoration filter changes according to the magnification.

11. The image processing apparatus according to claim 1, further comprising a determination unit configured to determine whether the second image information is acquired by the third acquisition unit, wherein the setting unit comprises:

a fifth calculation unit configured to, based on the first image information, calculate a third image restoration filter used in an image restoration process performed by the imaging system; and a sixth calculation unit configured to, in a case where the determination unit determines that the second image information is not acquired, calculate as the image restoration information a fourth image restoration filter having an image restoration strength proportional to an image restoration strength of the third image restoration filter calculated by the fifth calculation unit.

12. The image processing apparatus according to claim 11, wherein in a case where the image restoration strength of the third image restoration filter is equal to or greater than a predetermined value, the sixth calculation unit sets the image restoration strength of the fourth image restoration filter to a certain value.

13. The image processing apparatus according to claim 1, wherein the correction unit comprises a magnification unit configured to change a magnification of the captured image by a magnification according to an output size of an image in the image forming system, and is configured to correct, by the image restoration process, the captured image of which magnification is changed by the magnification unit, and
wherein the setting unit sets the image restoration information according to the magnification.

14. The image processing apparatus according to claim 1, wherein the setting unit further comprises an adjustment unit configured to adjust the image restoration information in such a manner that, as a result of the correction unit performing a restoration process, image failure does not occur in the captured image after correction, and
wherein the image failure is at least one of clipping of an image, ringing, an increase in noise, and color misregistration.

15. The image processing apparatus according to claim 1, wherein the setting unit comprises:
a third calculation unit configured to, based on the second image information acquired by the third acquisition unit, calculate a second image restoration filter for correcting image deterioration caused by the image forming system; and
an editing unit configured to edit, in an editing-allowed range that changes according to first image restoration information acquired by the second acquisition unit, the second image restoration filter calculated by the third calculation unit and set the edited second image restoration filter as the image restoration information.

16. The image processing apparatus according to claim 15, further comprising a display unit configured to display a user interface for receiving an input of an editing strength of the second image restoration filter calculated by the third calculation unit,
wherein the editing unit is configured to edit the second image restoration filter based on an editing strength input by the user,
wherein the first image restoration information is information indicating an image restoration strength of the image restoration process performed by the imaging system, and
wherein the image restoration strength and the editing strength are set in such a manner that the greater the image restoration strength, the smaller an upper limit of the editing strength.

17. An image processing apparatus comprising:
a first acquisition unit configured to acquire a captured image captured by an imaging system;
a second acquisition unit configured to acquire first image restoration information about an image restoration process that is possibly performed by the imaging system;
a display unit configured to display a user interface for receiving an input of an editing strength of an image restoration filter for correcting image deterioration caused by the image forming system, in an editing-allowed range that changes according to the first image restoration information acquired by the second acquisition unit; and
a correction unit configured to, using the image restoration filter edited based on an editing strength input by the user, correct the captured image acquired by the first acquisition unit.

18. An image processing method comprising:
acquiring, as first acquiring, a captured image captured by an imaging system;
acquiring, as second acquiring, first image information about a sharpness reduction that occurs in the captured image and is caused by the imaging system;
specifying a restoration process according to the first image information on the captured image;
acquiring second image information about a sharpness reduction caused by an image forming system for forming an image on a recording medium based on the captured image;
setting, based on the first image information and the second image information, image restoration information for correcting at least either of image deterioration caused by the imaging system and image deterioration caused by the image forming system; and
correcting the captured image by a restoration process using the image restoration information.

19. A non-transitory computer readable storage medium storing program for causing a computer to perform the image processing method according to claim 18.

* * * * *